United States Patent
Seo et al.

(10) Patent No.: US 10,779,271 B2
(45) Date of Patent: *Sep. 15, 2020

(54) METHOD AND APPARATUS FOR DECODING DOWNLINK CONTROL INFORMATION BY TERMINAL IN WIRELESS COMMUNICATION SYSTEM

(71) Applicant: LG ELECTRONICS INC., Seoul (KR)

(72) Inventors: Dongyoun Seo, Seoul (KR); Joonkui Ahn, Seoul (KR); Suckchel Yang, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,711

(22) Filed: Jul. 17, 2019

(65) Prior Publication Data

US 2019/0342869 A1    Nov. 7, 2019

Related U.S. Application Data

(63) Continuation of application No. 15/024,898, filed as application No. PCT/KR2014/009106 on Sep. 29, 2014, now Pat. No. 10,397,908.

(Continued)

(51) Int. Cl.
*H04W 72/04*    (2009.01)
*H04L 5/14*    (2006.01)
(Continued)

(52) U.S. Cl.
CPC ......... *H04W 72/042* (2013.01); *H04L 1/1822* (2013.01); *H04L 1/1864* (2013.01);
(Continued)

(58) Field of Classification Search
None
See application file for complete search history.

(56) References Cited

U.S. PATENT DOCUMENTS

2011/0090825 A1    4/2011    Papasakellariou et al.
2012/0044921 A1    2/2012    Chung et al.
(Continued)

FOREIGN PATENT DOCUMENTS

CN    103069731 A    4/2013
CN    103069905 A    4/2013
(Continued)

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 10)," 3GPP TS 36.212, V10.8.0, Jun. 2013; 20 pages.

(Continued)

*Primary Examiner* — Saba Tsegaye
(74) *Attorney, Agent, or Firm* — Birch, Stewart, Kolasch & Birch, LLP

(57) ABSTRACT

A method for receiving data includes transmitting, through a first cell, downlink control information (DCI) which schedules an uplink transmission at the first cell or a second cell; and receiving the data scheduled by the DCI through the first cell or the second cell, wherein the first cell is a cell based on a frequency division duplex (FDD) frame and the second cell is a cell based on a time division duplex (TDD) frame, and wherein when the DCI schedules an uplink transmission at the first cell, no uplink index field is included in the DCI.

10 Claims, 17 Drawing Sheets

Related U.S. Application Data

(60) Provisional application No. 61/883,224, filed on Sep. 27, 2013, provisional application No. 61/897,196, filed on Oct. 29, 2013, provisional application No. 61/932,773, filed on Jan. 28, 2014, provisional application No. 61/936,344, filed on Feb. 6, 2014, provisional application No. 61/939,663, filed on Feb. 13, 2014.

(51) Int. Cl.
*H04W 76/10* (2018.01)
*H04L 1/18* (2006.01)
*H04W 72/12* (2009.01)

(52) U.S. Cl.
CPC ........... *H04L 5/14* (2013.01); *H04W 72/1289* (2013.01); *H04W 76/10* (2018.02)

(56) References Cited

U.S. PATENT DOCUMENTS

| | | | |
|---|---|---|---|
| 2012/0230272 A1* | 9/2012 | Kim | H04L 1/1861 370/329 |
| 2012/0257552 A1 | 10/2012 | Chen et al. | |
| 2012/0307777 A1 | 12/2012 | Pan et al. | |
| 2013/0148623 A1 | 6/2013 | Nishio et al. | |
| 2013/0194981 A1 | 8/2013 | Wang et al. | |
| 2014/0293693 A1 | 10/2014 | Papasakellariou et al. | |
| 2015/0085711 A1 | 3/2015 | Wang et al. | |
| 2016/0057740 A1 | 2/2016 | Ko et al. | |
| 2016/0308659 A1 | 10/2016 | Wang et al. | |

FOREIGN PATENT DOCUMENTS

| | | |
|---|---|---|
| CN | 103326806 A | 9/2013 |
| JP | 2013-507840 A | 3/2013 |
| JP | 2013-533677 A | 8/2013 |
| KR | 10-2011-0134305 A | 12/2011 |
| KR | 10-2012-0004470 A | 1/2012 |
| KR | 10-2012-0125316 A | 11/2012 |
| WO | WO 2010/123331 A3 | 10/2010 |
| WO | WO 2011/097998 A1 | 8/2011 |
| WO | WO 2012/110830 A1 | 8/2012 |
| WO | WO 2013/105837 A1 | 7/2013 |
| WO | WO 2013/105838 A1 | 7/2013 |

OTHER PUBLICATIONS

3rd Generation Partnership Project, "Technical Specification Group Radio Access Network; Evolved Universal Terrestrial Radio Access (E-UTRA); Physical Channels and Modulation (Release 10)," 3GPP TS 36.211, V10.7.0, Feb. 2013, pp. 1-101.

LG Electronics, "CA-Based Aspects for FDD-TDD Joint Operation," 3GPP TSG RAN WG1 Meeting #74, R1-133372, Barcelona, Spain, Aug. 19-23, 2013, 3 pages.

Li et al., "Control channel design for carrier aggregation between LTE FDD and LTE TDD systems," Vehicular Technology Conference (VTC Spring), 2012 IEEE 75th, IEEE, 2012, 5 pages.

* cited by examiner

FIG. 6

| DCI format | | | | | | | | | | | | |
|---|---|---|---|---|---|---|---|---|---|---|---|---|
| 0 UL | CIF (3bit) | 0/1A | FH | N_UL_hop (1 or 2bit) | $\lceil \log_2(N_{RB}^{UL} \cdot (N_{RB}^{UL}+1)/2) \rceil$ | MCS/RV (5bit) | NDI | TPC (2bit) | DM RS CS (3bit) | CQI req. (1 or 2bit) | SRS (0 or 1) | RAT |
| | | | | | Multi-clustered RA | | | | | | | |
| 1A 1port/TXD | CIF (3bit) | 0/1A | L/D VRB | Gap | $\lceil \log_2(N_{RB}^{DL} \cdot (N_{RB}^{DL}+1)/2) \rceil$ | MCS (5bit) | HARQ (3bit) | NDI | RV (2bit) | TPC (2bit) | SRS (0 or 1) | ZP |
| 1 1port/TXD | CIF (3bit) | RA Hdr. | | | $\lceil N_{RB}^{DL}/P \rceil$ | | MCS (5bit) | HARQ (3bit) | NDI | RV (2bit) | TPC (2bit) | Conf |
| 1B CL SM 1L | CIF (3bit) | L/D VRB | | | $\lceil \log_2(N_{VRBgap1}^{DL}/N_{RB}^{step}+1)/2 \rceil$ | MCS (5bit) | HARQ (3bit) | NDI | RV (2bit) | TPC (2bit) | TPMI (2 or 4bit) | |
| 1C Compact DL | | Gap | $\lceil \log_2(\lceil N_{VRBgap1}^{DL}/N_{RB}^{step} \rceil \cdot \lceil N_{VRBgap1}^{DL}/N_{RB}^{step}+1 \rceil/2) \rceil$ | | | TBS (5bit) | | | | | | |
| 1D MU-MIMO | CIF (3bit) | L/D VRB | | | $\lceil \log_2(N_{RB}^{DL} \cdot (N_{RB}^{DL}+1)/2) \rceil$ | MCS (5bit) | HARQ (3bit) | NDI | RV (2bit) | TPC (2bit) | Pw Offset | |
| 2 CL SM | CIF (3bit) | RA Hdr. | TPC1 | $\lceil N_{RB}^{DL}/P \rceil$ | HARQ (3bit) | MCS1 | TB swap | NDI1 | RV1 (2bit) | TPC (2bit) | TPMI (2 or 4bit) | Precoding info (3 or 6bit) |
| | | | | | | | | | | | MCS2 (5bit) | NDI2 | RV2 (2bit) | |
| 2A LD CDD | CIF (3bit) | RA Hdr. | TPC1 | $\lceil N_{RB}^{DL}/P \rceil$ | HARQ (3bit) | MCS1 | TB swap | NDI1 | RV1 (2bit) | TPC (2bit) | MCS2 (5bit) | NDI2 | RV2 (2bit) | Rank (0 or 2bit) |
| 2B Dual L BF | CIF (3bit) | RA Hdr. | TPC1 | $\lceil N_{RB}^{DL}/P \rceil$ | HARQ (3bit) | Scrbl ID | MCS1 (5bit) | NDI1 Ant P | RV1 (2bit) | MCS2 (5bit) | NDI2 Ant P | RV2 (2bit) | |
| 2C 8L BF | CIF (3bit) | RA Hdr. | TPC1 | $\lceil N_{RB}^{DL}/P \rceil$ | HARQ (3bit) | 3bit Ant port, Scrbl ID, # of layer | MCS1 (5bit) | NDI1 Ant P | RV1 (2bit) | MCS2 (5bit) | NDI2 Ant P | RV2 (2bit) | |
| 3 2bit TPC | TPC1 (2bit) | | | $N=\lfloor L_{format0}/2 \rfloor$ | TPCN (2bit) | | | | | | | |
| 3A 1bit TPC | TPC1 (1bit) | | | $N = L_{format0}$ | TPCM (1bit) | | | | | | | |
| 4 UL MIMO | CIF (3bit) | $\max(\lceil \log_2(N_{RB}^{UL} \cdot (N_{RB}^{UL}+1)/2) \rceil, \lceil \log_2((\lceil N_{RB}^{UL}/P+1 \rceil))_4 \rceil)$ | TPC DM RS (2bit) CS (3bit) | CQI req. (1 or 2bit) | SRS reqst (2bit) | RAT | MCS /RV1 (5bit) | NDI1 (2bit) | MCS /RV2 (5bit) | NDI2 (2bit) | Precoding info (3 or 6bit) |

Rel10

FIG. 7

METHOD AND APPARATUS FOR DECODING DOWNLINK CONTROL INFORMATION BY TERMINAL IN WIRELESS COMMUNICATION SYSTEM

CROSS REFERENCE TO RELATED APPLICATIONS

This application is a Continuation of U.S. patent application Ser. No. 15/024,898 filed on Mar. 25, 2016 (now U.S. Pat. No. 10,397,908 issued on Aug. 27, 2019), which is a National Phase of PCT International Application No. PCT/KR2014/009106, filed on Sep. 29, 2014, which claims priority under 35 U.S.C. 119(e) to U.S. Provisional Application No. 61/883,224, filed on Sep. 27, 2013, U.S. Provisional Application No. 61/897,196, filed on Oct. 29, 2013, U.S. Provisional Application No. 61/932,773, filed on Jan. 28, 2014, U.S. Provisional Application No. 61/936,344, filed on Feb. 6, 2014, and U.S. Provisional Application No. 61/939,663, filed on Feb. 13, 2014, all of which are hereby expressly incorporated by reference into the present application.

BACKGROUND OF THE INVENTION

Field of the Invention

The present invention relates to a wireless communication, and more particularly, to a method and apparatus for decoding downlink control information in a wireless communication system in which the serving cells using radio frames of different types are aggregated.

Related Art

Long Term Evolution (LTE) based on 3rd Generation Partnership Project (3GPP) Technical Specification (TS) Release 8 is the leading next-generation mobile communication standard.

As disclosed in 3GPP TS 36.211 V8.7.0 (2009-05) "Evolved Universal Terrestrial Radio Access (E-UTRA); Physical Channels and Modulation (Release 8)", in LTE, a physical channel can be divided into a Physical Downlink Shared Channel (PDSCH) and a Physical Downlink Control Channel (PDCCH), that is, downlink channels, and a Physical Uplink Shared Channel (PUSCH) and a Physical Uplink Control Channel (PUSCH), that is, uplink channels.

A PUCCH is an uplink control channel used to send uplink control information, such as a Hybrid Automatic Repeat reQuest (HARQ), an acknowledgement/not-acknowledgement (ACK/NACK) signal, a Channel Quality Indicator (CQI), and a Scheduling Request (SR).

Meanwhile, 3GPP LTE-advanced (LTE-A) that is an evolution of 3GPP LTE has been progressed. One of techniques introduced in 3GPP LTE-A is the carrier aggregation.

The carrier aggregation uses a plurality of component carriers. The component carrier is defined by a center frequency and a bandwidth. One downlink component carrier or a pair of an uplink component carrier and a downlink component carrier corresponds to a cell. It can be said that a user equipment provided with services using a plurality of downlink component carriers is serviced by a plurality of serving cells. The carrier aggregation includes a cross carrier scheduling of which a scheduling cell and a scheduled cell are different from each other and a non-cross carrier scheduling of which a scheduling cell and a scheduled cell are the same.

Meanwhile, in the wireless communication system of the next generation, the serving cells using different radio frame structures such as a serving cell using a time division duplex (TDD) radio frame and a serving cell using a frequency division duplex (FDD) radio frame may be aggregated. That is, a plurality of serving cells that uses radio frames of different types may be allocated to a user equipment. Or, although a plurality of serving cells that uses radio frames of the same type is allocated, an uplink-downlink configuration of each serving cell may be different.

Meanwhile, a format of downlink control information is predetermined. That is, which fields are included in the downlink control information is predetermined. In addition, a bit number of each field is also predetermined. However, there is a field of which bit number changes depending on whether a format of the downlink control is used in the TDD or the FDD.

In case that the cross carrier scheduling is applied in the wireless communication system in which serving cells using radio frame structures different from each other are aggregated, there is a problem that a size of the downlink control information format transmitted from a scheduling cell may be changed depending on whether the scheduled cell is a FDD cell or a TDD cell. In this case, there is problem that a blind decoding count of a user equipment increases.

SUMMARY OF THE INVENTION

The present invention provides a method and apparatus for decoding downlink control information in a wireless communication system in which the serving cells using radio frames of different types are aggregated.

In one aspect, provided is a method for decoding downlink control information (DCI) by a user equipment in a wireless communication system in which different sorts of serving cells are configured. The method includes receiving DCI that schedules a second cell through a first cell and decoding the DCI. A size of the DCI is determined and decoded depending on whether the second cell is the same sort of cell with the first cell.

The first cell may be a primary cell that performs an initial connection establishment procedure or a connection reestablishment procedure, and the second cell may be a secondary cell which is additionally allocated in addition to the primary cell.

The first cell may be an FDD cell that uses a frequency division duplex (FDD) frame, and the second cell may be a TDD cell that uses a time division duplex (TDD) frame.

The DCI may include a specific field that has a bit size which is different when scheduling the FDD cell or the TDD cell which is solely used.

The specific field may have a same bit size when scheduling the FDD cell which is solely used when scheduling the TDD cell.

The specific field may be a field that includes a hybrid automatic repeat request (HARQ) process number, and configured by 3 bits.

The first cell may be a TDD cell that uses a time division duplex (TDD) frame, and the second cell is an FDD cell that uses a frequency division duplex (FDD) frame.

The DCI may include a specific field that has a bit size which is different when scheduling the FDD cell or the TDD cell which is solely used.

The specific field may have a same bit size when scheduling the TDD cell which is solely used when scheduling the FDD cell.

The specific field may be a field that includes a hybrid automatic repeat request (HARQ) process number, and configured by 4 bits.

In another aspect, provided is a user equipment (UE). The UE includes a RF unit configured to transmit and receive a radio signal and a processor connected to the RF unit. The process is configured to perform receiving DCI that schedules a second cell through a first cell and decoding the DCI. A size of the DCI is determined and decoded depending on whether the second cell is the same sort of cell with the first cell.

In a wireless communication system in which the serving cells using radio frames of different types are aggregated, a user equipment may efficiently perform decoding downlink control information.

BRIEF DESCRIPTION OF THE DRAWINGS

FIG. 6 illustrates structures of DCI formats used in FDD.
FIG. 7 illustrates structures of DCI formats used in TDD.

DESCRIPTION OF EXEMPLARY EMBODIMENTS

User Equipment (UE) can be fixed or can have mobility. UE can also be called another term, such as a Mobile Station (MS), a Mobile Terminal (MT), a User Terminal (UT), a Subscriber Station (SS), a wireless device, a Personal Digital Assistant (PDA), a wireless modem, or a handheld device.

The BS commonly refers to a fixed station that communicates with UE. The BS can also be called another term, such as an evolved-NodeB (eNodeB), a Base Transceiver System (BTS), or an access point.

Communication from a BS to UE is called downlink (DL), and communication from UE to a BS is called uplink (UL). A wireless communication system including a BS and UE can be a Time Division Duplex (TDD) system or a Frequency Division Duplex (FDD) system. A TDD system is a wireless communication system that performs UL and DL transmission/reception using different times in the same frequency band. An FDD system is a wireless communication system that enables UL and DL transmission/reception at the same time using different frequency bands. A wireless communication system can perform communication using radio frames.

Figure 1:
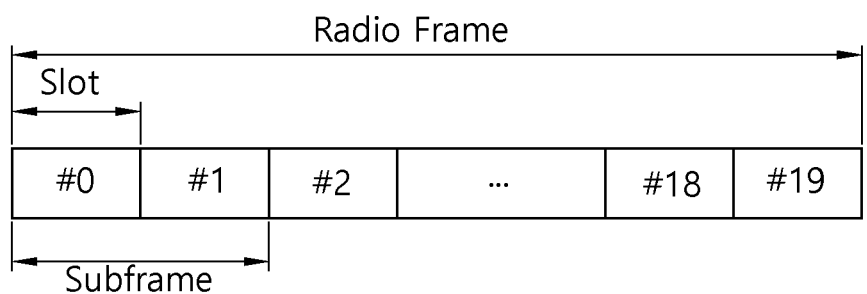
FIG. 1 shows the structure of an FDD radio frame.

FIG. 1 shows the structure of an FDD radio frame.

The FDD radio frame includes 10 subframes, and one subframe includes two consecutive slots. The slots within the radio frame are assigned indices 0-19. The time that is taken for one subframe to be transmitted is called a Transmission Time Interval (TTI). A TTI can be a minimum scheduling unit. For example, the length of one subframe can be 1 ms, and the length of one slot can be 0.5 ms. Hereinafter, the FDD radio frame may be simply referred to as an FDD frame.

Figure 2:
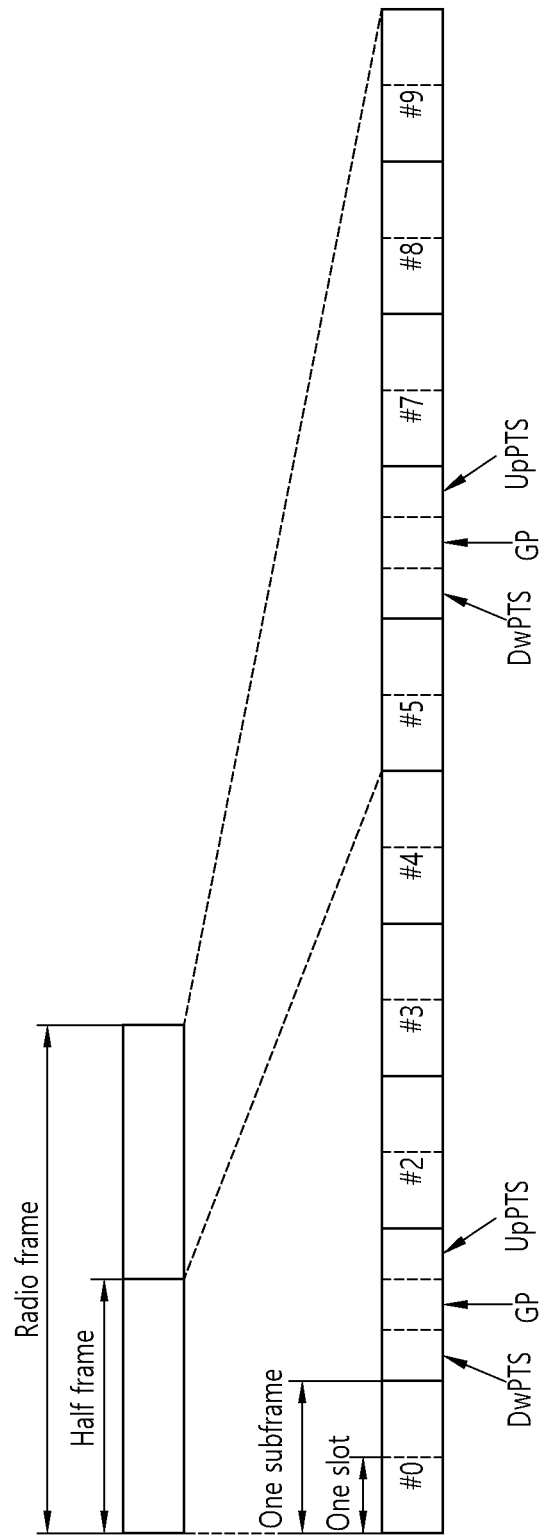
FIG. 2 shows the structure of a TDD radio frame.

FIG. 2 shows the structure of a TDD radio frame.

Referring to FIG. 2, a downlink (DL) subframe and an uplink (UL) subframe coexist in a TDD radio frame used in TDD. Table 1 shows an example of a UL-DL configuration of the radio frame.

TABLE 1

| Uplink-downlink configuration | Downlink-to-uplink switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' indicates a DL subframe, 'U' indicates a UL subframe, and 'S' indicates a special subframe. When a UL-DL configuration is received from a BS, a UE can be aware of whether each subframe in a radio frame is a DL subframe or a UL subframe. Hereinafter, reference can be made to Table 1 for a UL-DL configuration N (N is any one of 0 to 6).

In the TDD frame, a subframe having an index #1 and an index #6 may be a special subframe, and includes a downlink pilot time slot (DwPTS), a guard period (GP), and an uplink pilot time slot (UpPTS). The DwPTS is used in initial cell search, synchronization, or channel estimation in UE. The UpPTS is used for channel estimation in a BS and for the uplink transmission synchronization of UE. The GP is an interval in which interference occurring in UL due to the multi-path delay of a DL signal between UL and DL is removed. Hereinafter, the TDD radio frame may be simply referred to as a TDD frame.

Figure 3:
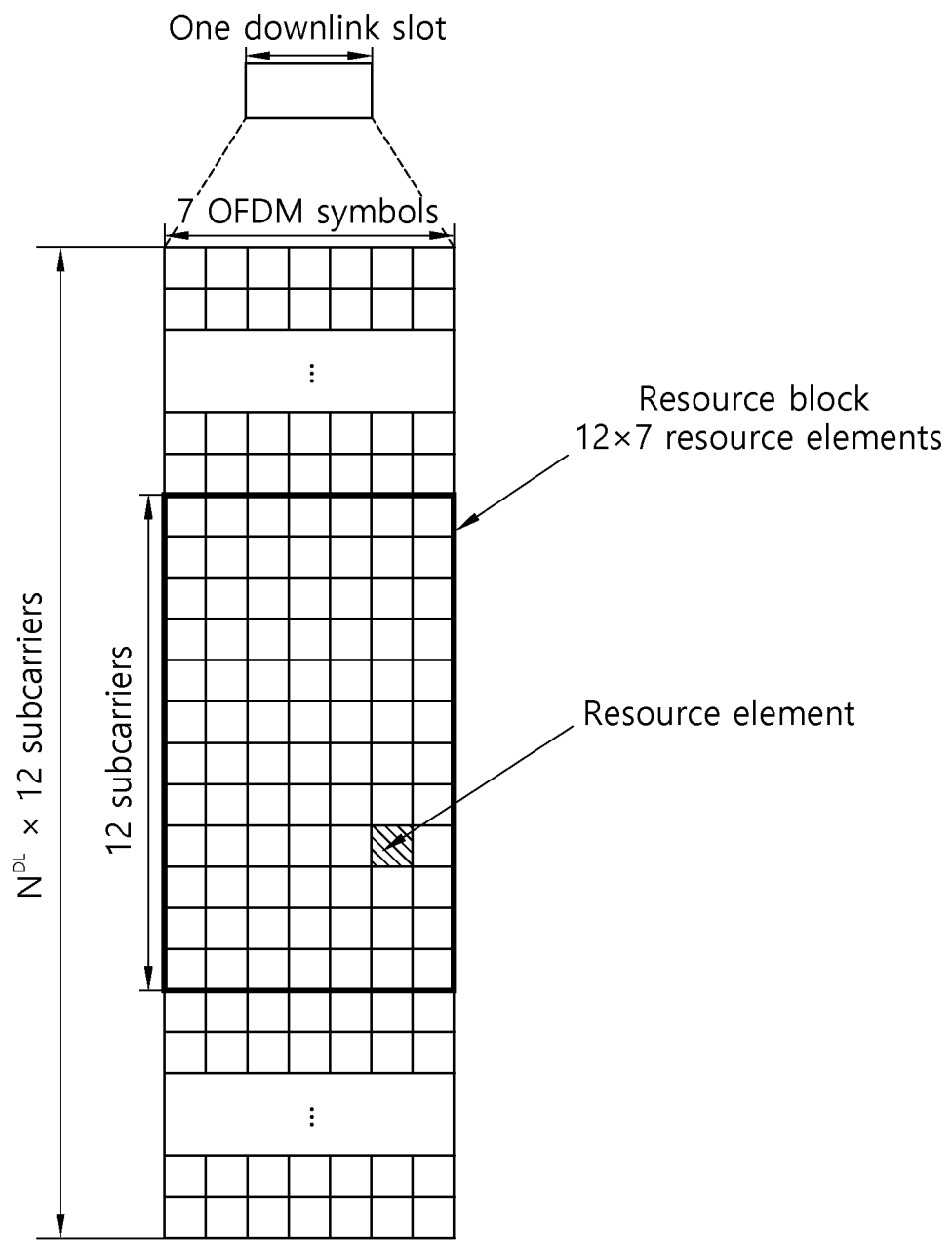
FIG. 3 shows an example of a resource grid for one downlink slot.

FIG. 3 shows an example of a resource grid for one downlink slot.

Referring to FIG. 3, the downlink slot includes a plurality of Orthogonal Frequency Division Multiplexing (OFDM) symbol in the time domain and includes $N_{RB}$ Resource Blocks (RBs) in the frequency domain. The RBs includes one slot in the time domain and a plurality of consecutive subcarrier in the frequency domain in a resource allocation unit. The number of RBs $N_{RB}$ included in the downlink slot depends on a downlink transmission bandwidth NDL configured in a cell. For example, in an LTE system, the $N_{RB}$ can be any one of 6 to 110. An uplink slot can have the same structure as the downlink slot.

Each element on the resource grid is called a Resource Element (RE). The RE on the resource grid can be identified by an index pair (k,l) within a slot. Here, k (k=0, . . . , $N_{RB} \times 12-1$) is a subcarrier index within the frequency domain, and l (l=0, . . . , 6) is an OFDM symbol index within the time domain.

Although 7×12 REs including 7 OFDM symbols in the time domain and 12 subcarrier in the frequency domain have been illustrated as being included in one RB in FIG. 3, the number of OFDM symbols and the number of subcarriers within an RB are not limited thereto. The number of OFDM symbols and the number of subcarriers can be changed in various ways depending on the length of a CP, frequency spacing, etc. In one OFDM symbol, one of 128, 256, 512, 1024, 1536, and 2048 can be selected and used as the number of subcarriers.

Figure 4:
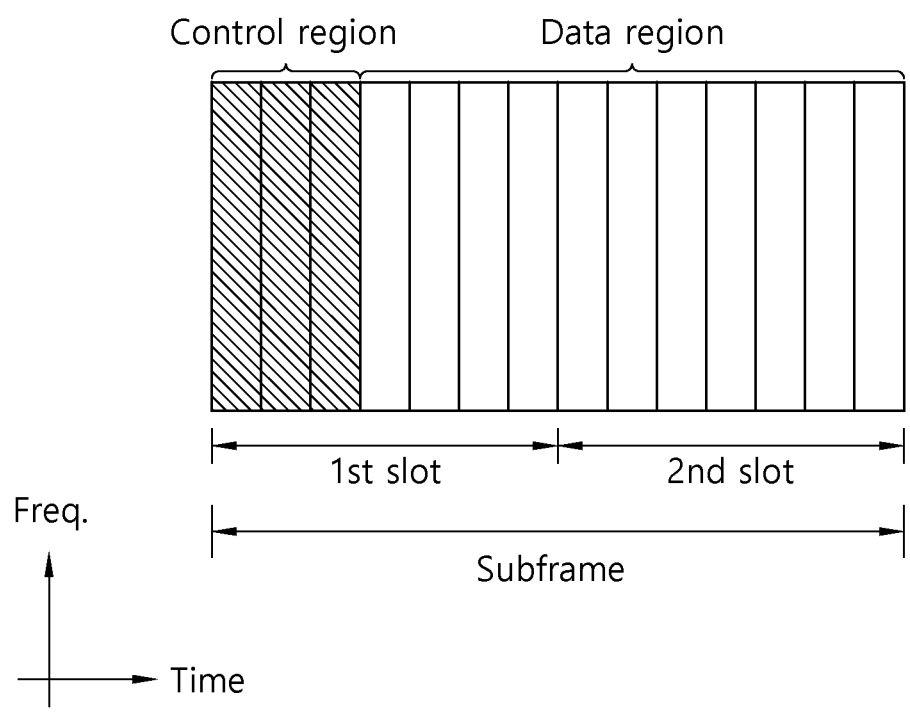
FIG. 4 shows the structure of a DL subframe.

FIG. 4 shows the structure of a DL subframe.

Referring to FIG. 4, a downlink (DL) subframe is divided into a control region and a data region in the time domain. The control region includes a maximum of former 3 (maximum 4 according to circumstances) OFDM symbols of a first slot within a subframe, but the number of OFDM symbols included in the control region can be changed. A control channel different from a physical downlink control channel (PDCCH) is allocated to the control region, and a physical downlink shared channel (PDSCH) is allocated to the data region.

As disclosed in 3GPP TS 36.211 V8.7.0, in 3GPP LTE, physical channels can be divided into a physical downlink shared channel (PDSCH) and a physical uplink shared channel (PUSCH), that is, data channels, and a physical downlink control channel (PDCCH), a physical control format indicator channel (PCFICH), a physical hybrid-ARQ indicator channel (PHICH), and a physical uplink control channel (PUCCH), that is, control channels.

A PCFICH that is transmitted in the first OFDM symbol of a subframe carries a Control Format Indicator (CFI) regarding the number of OFDM symbols (i.e., the size of a control region) that are used to send control channels within the subframe. UE first receives a CFI on a PCFICH and then monitors PDCCHs. Unlike in a PDCCH, a PCFICH is not subject to blind decoding, but is transmitted through the fixed PCFICH resources of a subframe.

A PHICH carries a positive-acknowledgement (ACK)/negative-acknowledgement (NACK) signal for an uplink Hybrid Automatic Repeat reQuest (HARQ). An ACK/NACK signal for uplink (UL) data on a PUSCH which is transmitted by UE is transmitted on a PHICH.

A physical broadcast channel (PBCH) is transmitted in the former 4 OFDM symbols of a second slot within the first subframe of a radio frame. The PBCH carries system information that is essential for UE to communicate with a BS, and system information transmitted through a PBCH is called a Master Information Block (MIB). In contrast, system information transmitted on a PDSCH indicated by a PDCCH is called a System Information Block (SIB).

Control information transmitted through a PDCCH is called Downlink Control Information (DCI). DCI can include the resource allocation of a PDSCH (this is also called a DL grant), the resource allocation of a PUSCH (this is also called an UL grant), a set of transmit power control commands for individual MSs within a specific UE group and/or the activation of a Voice over Internet Protocol (VoIP). DCI has different formats, which will be described later.

A channel region in a subframe includes a plurality of control channel elements (CCEs). A CCE is a logical allocation unit used to provide a coding rate according to the state of a radio channel to a PDCCH and corresponds to a plurality of resource element groups (REGs). An REG includes a plurality of REs. A PDCCH format and the number of available PDCCH bits are determined based on a relationship between the number of CCEs and a coding rate provided by CCEs.

One REG includes four REs, and one CCE includes nine REGs. To construct one PDCCH, {1, 2, 4, 8} CCEs may be used, and each element of {1, 2, 4, 8} is defined as a CCE aggregation level.

The number of CCEs used to transmit a PDDCH is determined by a base station based on a channel state.

Figure 5:
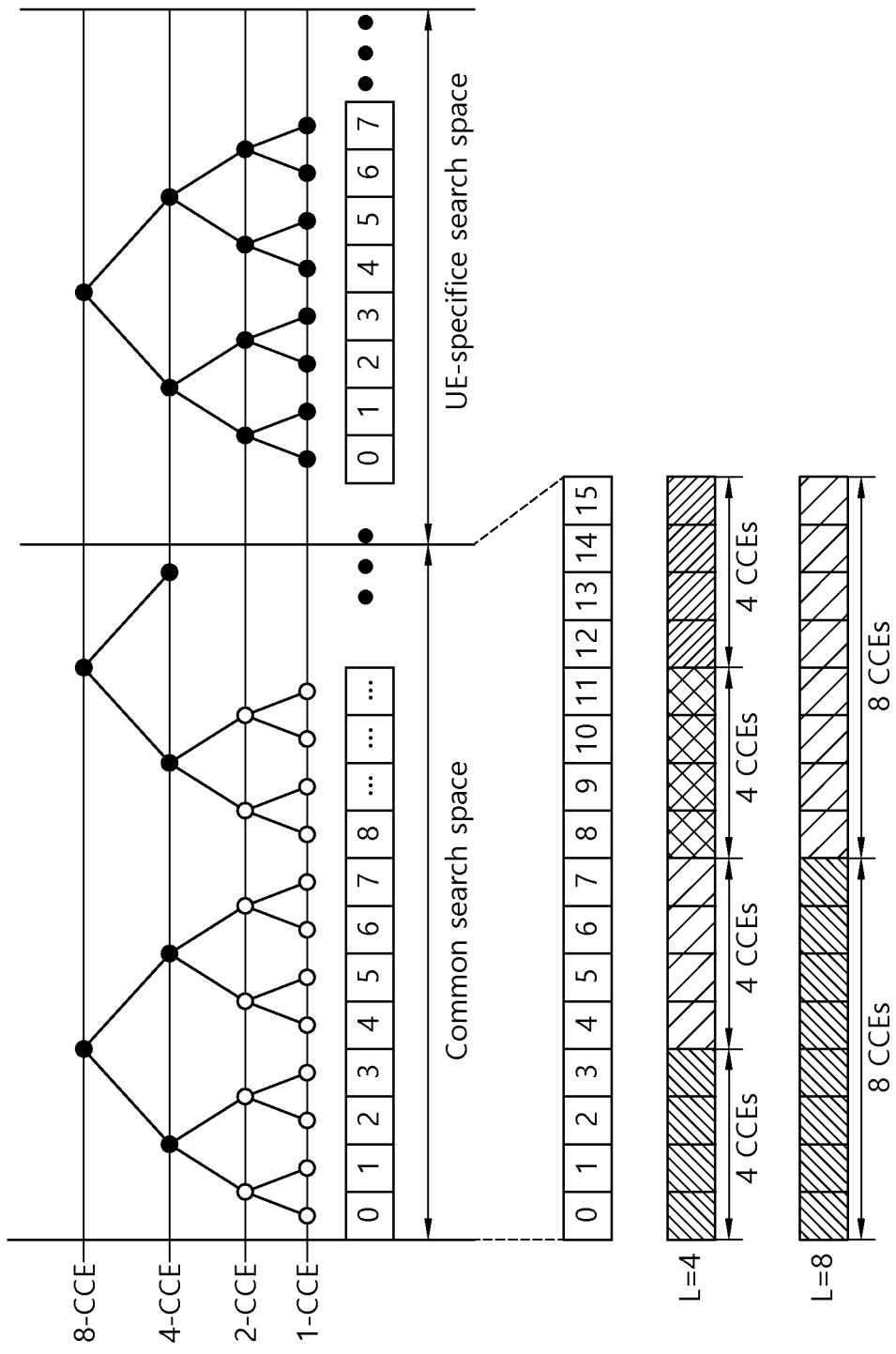
FIG. 5 illustrates an example of PDCCH monitoring.

FIG. 5 illustrates an example of PDCCH monitoring.

In 3GPP LTE, blind decoding is used to detect a PDCCH. Blind decoding is a process of de-masking a cyclic redundancy check (CRC) of a received PDCCH (PDCCH candidate) with a desired identifier to check a CRC error, thereby allowing a UE to identify whether the PDCCH is a control channel of the UE. The UE does not recognize a position in which a PDCCH thereof is transmitted in a control region and a CCE aggregation level or DCI format used to transmit the PDCCH.

A plurality of PDCCHs may be transmitted in one subframe. The UE monitors a plurality of PDCCHs in each subframe. Here, monitoring refers to an attempt of the UE to decode a PDCCH according to a monitored PDCCH format.

In 3GPP LET, a search space is used to reduce load caused by blind decoding. A search space may denote a monitoring set of CCEs for a PDCCH. A UE monitors a PDCCH in a corresponding search space.

A search space is divided into a common search space (CSS) and a UE-specific search space (USS). A CSS is a space for searching for a PDCCH having common control information, which includes 16 CCEs with CCE indexes of 0 to 15 and supports a PDCCH having a CCE aggregation level of {4, 8}. However, a PDCCH (DCI format 0 and 1A) carrying UE-specific information may also be transmitted to the CSS. The USS supports a PDCCH having a CEE aggregation level of {1, 2, 4, 8}.

A different start point of a search space is defined for a CSS and a USS. A start point of a CSS is fixed regardless of subframes, while a start point of a USS may change by subframe according to an UE ID (for example, C-RNTI), a CCE aggregation level and/or a slot number in a radio frame. When the start point of the USS is in the CSS, the USS and the CSS may overlap.

Hereinafter, conventional DCI formats transmitted on a PDCCH will be described.

Figure 7:
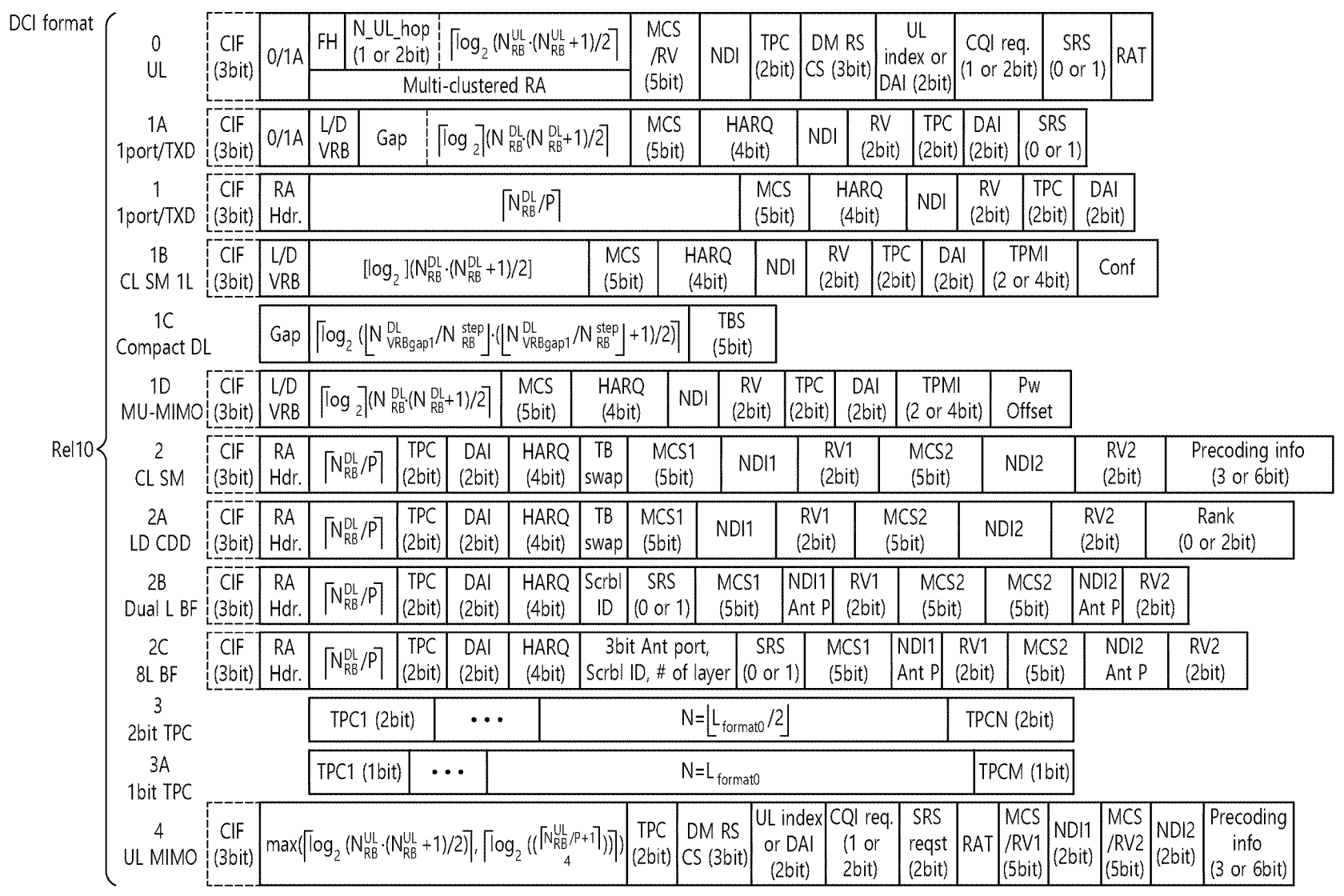

FIG. 6 illustrates structures of DCI formats used in FDD, and FIG. 7 illustrates structures of DCI formats used in TDD. In FIGS. 6 and 7, DCI format # A is represented simply by # A.

Referring to FIGS. 6 and 7, the DCI formats include fields to be described below, and the respective fields may be mapped to information bits $a_0$ to $a_{A-1}$. The respective fields may be mapped in order described in each DCI format and include padding bits 0. A first field may be mapped to a lowest-order information bit $a_0$, and other consecutive fields may be mapped to high-order information bits. A most significant bit (MSB) in each field may be mapped to a lowest-order information bit in the field. For example, an MSB in the first field may be mapped to $a_0$. Hereinafter, a set of fields included in each conventional DCI format is referred to as an information field.

1. DCI Format 0

DCI format 0 is used for PUSCH scheduling in one uplink cell. The following information (fields) is transmitted through DCI format 0:

1) Carrier indicator field (CIF, same hereinafter), which may have a length of 0 or 3 bits; 2) Flag for DCI format 0 and DCI format 1A differentiation (0 indicates DCI format 0 and 1 indicates DCI format 1A); 3) Frequency hopping flag (1 bit); 4) Resource block assignment and hopping resource allocation; 5) Modulation and coding scheme and redundancy version (5 bits); 6) New data indicator (1 bit); 7) TPC command for scheduled PUSCH (2 bits); 8) Cyclic shift for DM-RS and orthogonal cover code (OCC) index (3 bits); 9) UL index (2 bits); 10) Downlink assignment index (DAI, only for TDD); 11) CSI request; 12) Sounding reference signal (SRS) request (present only in DCI formats scheduling a PUSCH, mapped to a USS); and 13) Resource allocation type (present only when the number of RBs allocated to a downlink is the number of RBs allocated to an uplink or greater). If the number of information bits in DCI format 0 is smaller than payload size of DCI format 1A, DCI format 0 is padded with 0 to be equal to the payload size of DCI format 1A.

2. DCI Format 1

DCI format 1 is used for scheduling one PDSCH codeword in one cell. The following information is transmitted through DCI format 1:

1) CIF (0 or 3 bits); 2) Resource allocation header (indicating resource allocation type 0/type 1)—not included on the assumption of resource allocation type 0 when a downlink bandwidth is smaller than 10 PRB, the resource allocation header is not included; 3) Resource block assignment; 4) Modulation and coding scheme (5 bits); 5) HARQ process number (3 bits for FDD and 4 bits for TDD); 6) New data indicator (1 bit); 7) Redundancy version (2 bits); 8) TPC command for PUCCH (2 bits); 9) DAI (2 bits, only for TDD); and 10) HARQ-ACK resource offset (2 bits). If the number of information bits in DCI format 1 is equal to that in DCI format 0/1A, one bit having a value of 0 is added to DCI format 1. If the number of information bits in DCI format 1 is one of {12, 14, 16, 20, 24, 26, 32, 40, 44, 56}, one or more bits having a value of 0 are added to DCI format 1 so that DCI format 1 has a different payload size from {12, 14, 16, 20, 24, 26, 32, 40, 44, 56} and payload sizes of DCI format 0/1A.

3. DCI Format 1A

DCI format 1A is used for compact scheduling of one PDSCH in one cell codeword or a random access process induced by a PDCCH command. DCI corresponding to a PDCCH command may be transmitted through a PDCCH or enhanced PDCCH (EPDCCH).

The following information is transmitted through DCI format 1A: 1) CIF (0 or 3 bits); 2) Flag for DCI format 0 and DCI format 1A differentiation (1 bit); 3) Localized/distributed virtual resource block (VRB) assignment flag (1 bit); 4) Resource block assignment; 5) Preamble index (6 bits); 6) Physical random access channel (PRACH) mask index (4 bits); 7) Modulation and coding scheme (5 bits); 8) HARQ process number (3 bits); 9) New data indicator (1 bit); 10) Redundancy version (2 bits); 11) TPC command for PUCCH (2 bits); 12) DAI (2 bits, only for TDD); 13) SRS request (0 or 1 bit); and 14) HARQ-ACK resource offset (2 bits). If the number of information bits in DCI format 1A is smaller than the number of information bits in DCI format 0, bits having a value of 0 are added so that DCI format 1A has the same payload size as DCI format 0. If the number of information bits in DCI format 1A is one of {12, 14, 16, 20, 24, 26, 32, 40, 44, 56}, one bit having a value of 0 is added to DCI format 1A.

4. DCI Format 1B

DCI format 1B includes precoding information and is used for simple scheduling of one PDSCH codeword in one cell. The following information is transmitted through DCI format 1B:

1) CIF (0 or 3 bits); 2) Localized/distributed (VRB) assignment flag (1 bit); 3) Resource block assignment; 4) Modulation and coding scheme (5 bits); 5) HARQ process number (3 bits); 6) New data indicator (1 bit); 7) Redundancy version (2 bits); 8) TPC command for PUCCH (2 bits); 9) DAI (2 bits, only for TDD); 10) Transmitted precoding matrix indicator (TPMI) information for precoding; and 11) PMI confirmation for precoding (1 bit). If the number of information bits in DCI format 1B is equal to one of {12, 14, 16, 20, 24, 26, 32, 40, 44, 56}, one bit having a value of 0 is added to DCI format 1B.

5. DCI Format 1C

DCI format 1C is used for very compact scheduling of one PDSCH codeword and multicast control channel (MCCH) change notification. In the very compact scheduling, the following information is transmitted through DCI format 1C: 1) Gap value indicator (1 bit); 2) Resource block assignment; and 3) Modulation and coding scheme. In the MCCH change notification, the following information is transmitted through DCI format 1C: 1) MCCH change notification information (8 bits); and 2) Reserved information bits.

6. DCI Format 1D

DCI format 1D includes precoding and power offset information and is used for simple scheduling of one PDSCH codeword in one cell.

The following information is transmitted through DCI format 1D:

1) CIF (0 or 3 bits); 2) Localized/distributed (VRB) assignment flag (1 bit); 3) Resource block assignment; 4) Modulation and coding scheme (5 bits); 5) HARQ process number (3 bits for FDD and 4 bits for TDD); 6) New data indicator (1 bit); 7) Redundancy version (2 bits); 8) TPC command for PUCCH (2 bits); 9) DAI (2 bits, only for TDD); 10) TPMI information for precoding; 11) Downlink power offset (1 bit); and 12) HARQ-ACK resource offset (2 bits). If the number of information bits in DCI format 1D is equal to one of {12, 14, 16, 20, 24, 26, 32, 40, 44, 56}, one bit having a value of 0 is added to DCI format 1D.

7. DCI Format 2

DCI format 2 is used for assignment of a PDSCH for a closed-loop MIMO operation. The following information is transmitted through DCI format 2:

1) CIF (0 or 3 bits); 2) Resource allocation header (1 bit); 3) Resource block assignment; 4) TPC command for PUCCH (2 bits); 5) DAI (2 bits, only for TDD); 6) HARQ process number (3 bits for FDD and 4 bits for TDD); 7) Transport block to codeword swap flag (1 bit); 8) Modulation and coding scheme (5 bits); 9) New data indicator (1 bit); 10) Redundancy version (2 bits); 11) Precoding information; and 12) HARQ-ACK resource offset. 8) to 10) may be given to each transport block.

8. DCI Format 2A

DCI format 2A is used for assignment of a PDSCH for an open-loop MIMO operation. The following information is transmitted through DCI format 2A:

1) CIF (0 or 3 bits); 2) Resource allocation header (1 bit); 3) Resource block allocation; 4) TPC command for PUCCH (2 bits); 5) Downlink assignment flag (DAI, 2 bits, only for TDD); 6) HARQ process number (3 bits for FDD and 4 bits for TDD); 7) Transport block to codeword swap flag (1 bit); 8) Modulation and coding scheme (5 bits); 9) New data indicator (1 bit); 10) Redundancy version (2 bits); 11) Precoding information; and 12) HARQ-ACK resource offset.

9. DCI Format 2B

The following information is transmitted through DCI format 2B:

1) CIF (0 or 3 bits); 2) Resource allocation header (1 bit); 3) Resource block allocation; 4) TPC command for PUCCH (2 bits); 5) Downlink assignment flag (DAI, 2 bits, only for TDD); 6) HARQ process number (3 bits for FDD and 4 bits for TDD); 7) Scrambling identity (ID) (1 bit); 8) SRS request (0 or 1 bit); 9) Modulation and coding scheme (5 bits); 10) New data indicator (1 bit); 11) Redundancy version (2 bits); and 12) HARQ-ACK resource offset.

10. DCI Format 2C

The following information is transmitted through DCI format 2C:

1) CIF (0 or 3 bits); 2) Resource allocation header (1 bit); 3) Resource block allocation; 4) TPC command for PUCCH (2 bits); 5) Downlink assignment flag (DAI, 2 bits, only for TDD); 6) HARQ process number (3 bits for FDD and 4 bits for TDD); 7) Antenna port, scrambling ID and number of layers (3 bits); 8) SRS request (0 or 1 bit); 9) Modulation and coding scheme (5 bits); 10) New data indicator (1 bit); 11) Redundancy version (2 bits); and 12) HARQ-ACK resource offset.

11. DCI Format 2D

The following information is transmitted through DCI format 2D:

1) CIF (0 or 3 bits); 2) Resource allocation header (1 bit); 3) Resource block allocation; 4) TPC command for PUCCH (2 bits); 5) Downlink assignment flag (DAI, 2 bits, only for TDD); 6) HARQ process number (3 bits for FDD and 4 bits for TDD); 7) Antenna port, scrambling ID and number of layers (3 bits); 8) SRS request (0 or 1 bit); 9) Modulation and coding scheme (5 bits); 10) New data indicator (1 bit); 11) Redundancy version (2 bits); 12) PDSCH resource element mapping and quasi-co-location indicator; and 13) HARQ-ACK resource offset.

12. DCI Format 3

DCI format 3 is used to transmit TPC commands for a PUCCH and PUSCH with 2-bit power adjustment. N TCP commands may be transmitted through DCI format 3.

13. DCI Format 3A

DCI format 3A is used to transmit TPC commands for a PUCCH and PUSCH with 1-bit power adjustment. M TCP commands may be transmitted through DCI format 3A.

14. DCI Format 4

DCI format 4 is used for scheduling of a PUSCH in one uplink cell having a multi-antenna port transmission mode.

1) CIF (0 or 3 bits); 2) Resource block allocation; 4) TPC command for PUSCH (2 bits); 4) Cyclic shift for DM-RS and OCC index (3 bits); 5) UL index (2 bits); 6) Downlink assignment flag (DAI, 2 bits, only for TDD); 7) CSI request (1 or 2 bits); 8) SRS request (2 bits); 9) Resource allocation type (1 bit); 10) Modulation and coding scheme and redundancy version (5 bits); 11) New data indicator (1 bit); and 12) Precoding information and number of layers.

Figure 8:
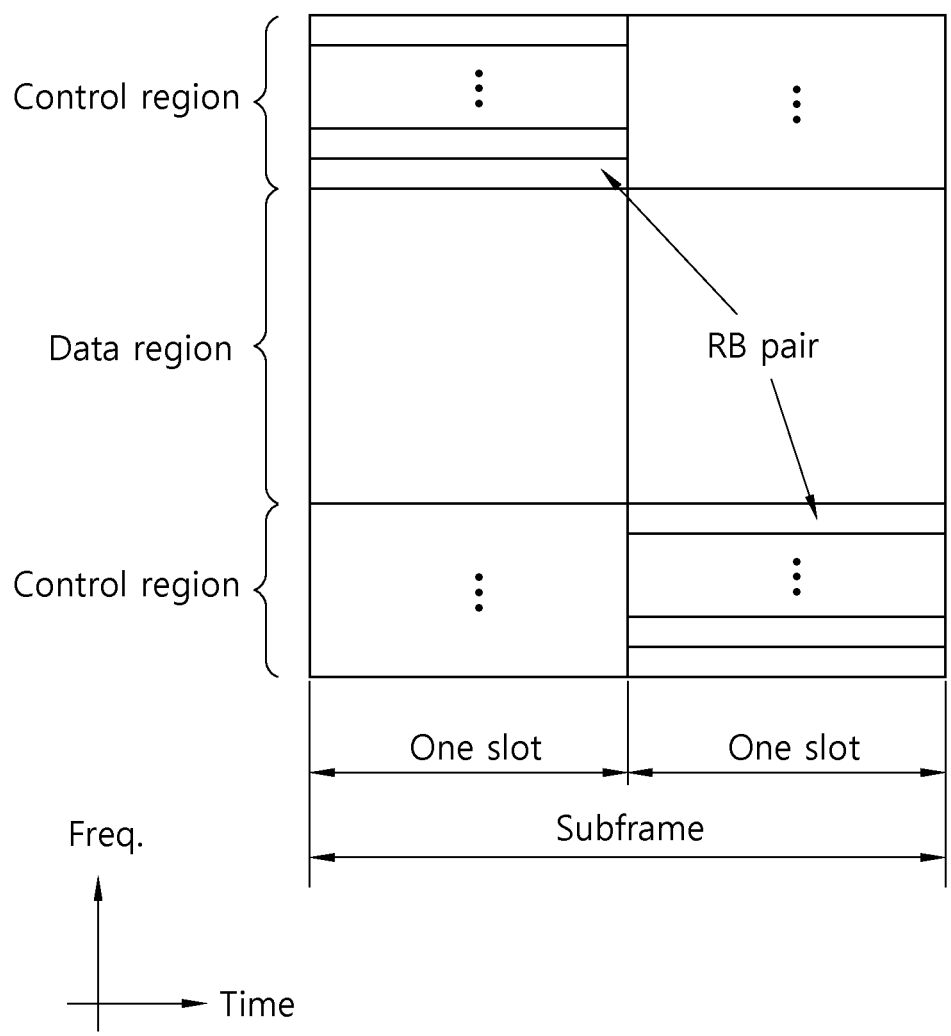
FIG. 8 shows the structure of an UL subframe.

FIG. 8 shows the structure of an UL subframe.

Referring to FIG. 8, the UL subframe can be divided into a control region to which a physical uplink control channel (PUCCH) for carrying uplink control information is allocated and a data region to which a physical uplink shared channel (PUSCH) for carrying user data is allocated in the frequency domain.

A PUCCH is allocated with an RB pair in a subframe. RBs that belong to an RB pair occupy different subcarriers in a first slot and a second slot. An RB pair has the same RB index m.

In accordance with 3GPP TS 36.211 V8.7.0, a PUCCH supports multiple formats. A PUCCH having a different number of bits in each subframe can be used according to a modulation scheme that is dependent on a PUCCH format.

Table 2 below shows an example of modulation schemes and the number of bits per subframe according to PUCCH formats.

TABLE 2

| PUCCH format | Modulation scheme | Number of bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used to send a Scheduling Request (SR), the PUCCH formats 1a/1b are used to send an ACK/NACK signal for an HARQ, the PUCCH format 2 is used to send a CQI, and the PUCCH formats 2a/2b are used to send a CQI and an ACK/NACK signal at the same time. When only an ACK/NACK signal is transmitted in a subframe, the PUCCH formats 1a/1b are used. When only an SR is transmitted, the PUCCH format 1 is used. When an SR and an ACK/NACK signal are transmitted at the same time, the PUCCH format 1 is used. In this case, the ACK/NACK signal is modulated into resources allocated to the SR and is then transmitted.

All the PUCCH formats use the Cyclic Shift (CS) of a sequence in each OFDM symbol. A CS sequence is generated by cyclically shifting a base sequence by a specific CS amount. The specific CS amount is indicated by a CS index.

An example in which a base sequence $r_u(n)$ has been defined is the same as the following equation.

$$r_u(n) = e^{jb(n)\pi/4}$$ [Equation 1]

Here, u is a root index, n is an element index wherein $0 \leq n \leq N-1$, and N is the length of the base sequence. b(n) is defined in section 5.5 of 3GPP TS 36.211 V8.7.0.

The length of a sequence is the same as the number of elements included in the sequence. U can be determined by a cell identifier (ID), a slot number within a radio frame, etc.

Assuming that a base sequence is mapped to one resource block in the frequency domain, the length N of the base sequence becomes 12 because one resource block includes 12 subcarriers. A different base sequence is defined depending on a different root index.

A CS sequence $r(n, I_{cs})$ can be generated by cyclically shifting the base sequence r(n) as in Equation 2.

$$r(n, I_{CS}) = r(n) \cdot \exp\left(\frac{j2\pi I_{CS} n}{N}\right), 0 \leq I_{CS} \leq N-1 \quad \text{[Equation 2]}$$

Here, $I_{cs}$ is a CS index indicative of a CS amount ($0 \leq I_{cs} \leq N-1$).

An available CS index of a base sequence refers to a CS index that can be derived from the base sequence according to a CS interval. For example, the length of a base sequence is 12 and a CS interval is 1, a total number of available CS indices of the base sequence becomes 12. Or, if the length of a base sequence is 12 and a CS interval is 2, a total number of available CS indices of the base sequence becomes 6.

Figure 9:
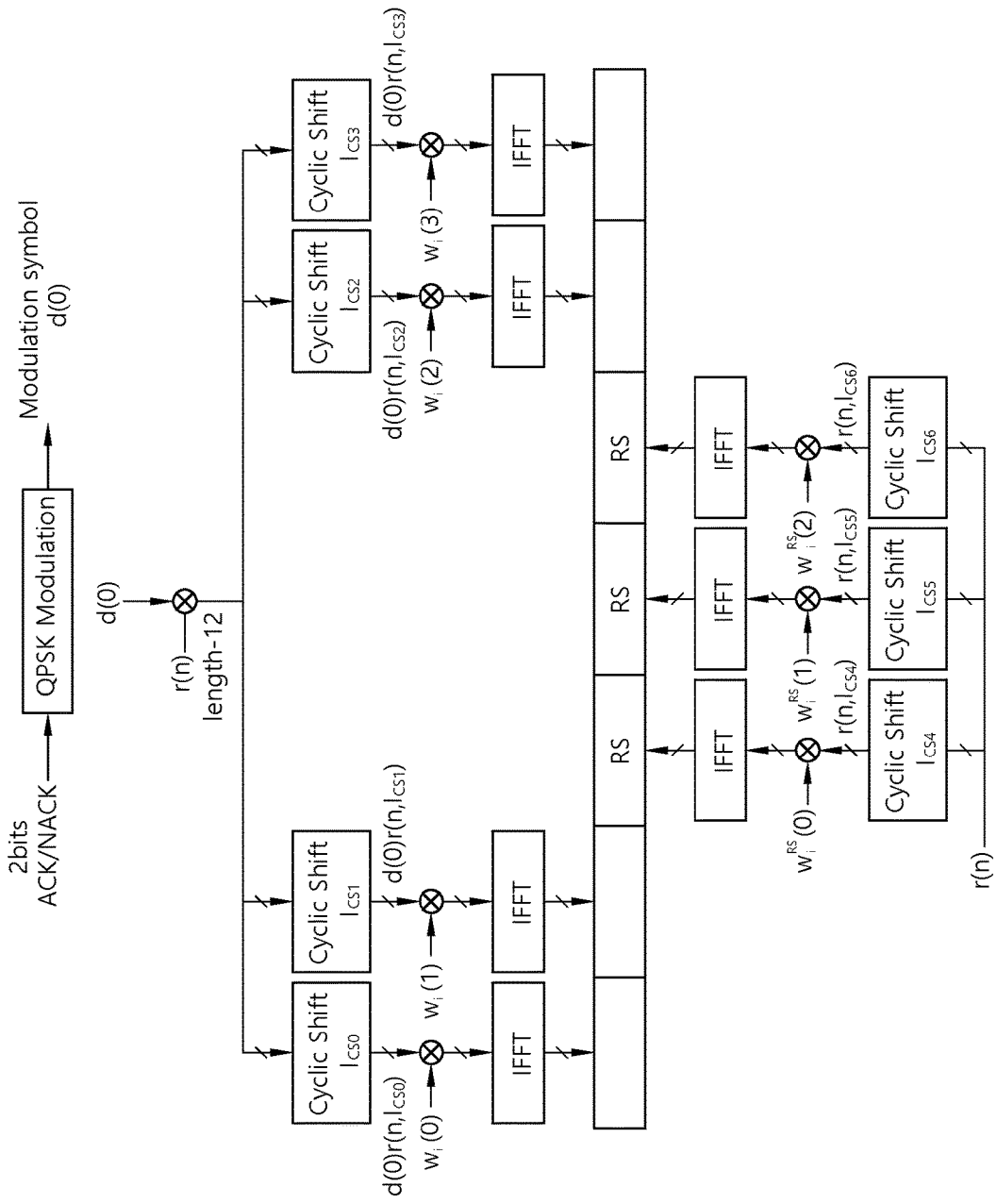
FIG. 9 shows the channel structure of a PUCCH format 1b in a normal CP.

FIG. 9 shows the channel structure of the PUCCH format 1b in a normal CP.

One slot includes 7 OFDM symbols, the 3 OFDM symbols become Reference Signal (RS) OFDM symbols for a reference signal, and the 4 OFDM symbols become data OFDM symbols for an ACK/NACK signal.

In the PUCCH format 1b, a modulation symbol d(0) is generated by performing Quadrature Phase Shift Keying (QPSK) modulation on an encoded 2-bit ACK/NACK signal.

A CS index $I_{cs}$ can vary depending on a slot number 'ns' within a radio frame and/or a symbol index '1' within a slot.

In a normal CP, 4 data OFDM symbols for sending an ACK/NACK signal are present in one slot. It is assumed that corresponding CS indices in respective data OFDM symbols are $I_{cs0}$, $I_{as1}$, $I_{cs2}$, and $I_{cs3}$.

The modulation symbol d(0) is spread into a CS sequence $r(n, I_{cs})$. Assuming that a 1-dimensional spread sequence corresponding to an $(i+1)^{th}$ OFDM symbol is m(i) in a slot, {m(0), m(1), m(2), m(3)}={d(0)r(n,$I_{cs0}$), d(0)r(n,$I_{cs1}$), d(0)r(n,$I_{cs2}$), d(0)r(n,$I_{cs3}$)} can be obtained.

In order to increase a UE capacity, the 1-dimensional spread sequence can be spread using an orthogonal sequence. The following sequence is used as an orthogonal sequence $w_i(k)$ (i is a sequence index, $0 \leq k \leq K-1$) wherein a spreading factor K=4.

TABLE 3

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

The following sequence is used as an orthogonal sequence $w_i(k)$ (i is a sequence index, $0 \leq k \leq K-1$) wherein a spreading factor K=3.

TABLE 4

| Index (i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spreading factor can be used in each slot.

Accordingly, assuming that a specific orthogonal sequence index i is given, 2-dimensional spread sequences {s(0), s(1), s(2), s(3)} can be expressed as follows.

{s(0), s(1), s(2), s(3)}={$w_i(0)$m(0), $w_i(1)$m(1), $w_i(2)$m(2), $w_i(3)$m(3)}

The 2-dimensional spread sequences {s(0), s(1), s(2), s(3)} are subject to IFFT and then transmitted in a corresponding OFDM symbol. Accordingly, an ACK/NACK signal is transmitted on a PUCCH.

A reference signal having the PUCCH format 1b is also transmitted by spreading the reference signal into an orthogonal sequence after cyclically shifting a base sequence r(n). Assuming that CS indices corresponding to 3 RS OFDM symbols are $I_{cs4}$, $I_{cs5}$, and $I_{cs6}$, 3 CS sequences $r(n, I_{cs4})$, $r(n, I_{cs5})$, $r(n, I_{cs6})$ can be obtained. The 3 CS sequences are spread into an orthogonal sequence $w^{RS}_i(k)$ wherein K=3.

An orthogonal sequence index i, a CS index $I_{cs}$, and an RB index m are parameters necessary to configure a PUCCH and are also resources used to classify PUCCHs (or MSs). If the number of available CSs is 12 and the number of available orthogonal sequence indices is 3, a PUCCH for a total of 36 MSs can be multiplexed with one RB.

In 3GPP LTE, a resource index $n^{(1)}_{PUCCH}$ is defined so that UE can obtain the three parameters for configuring a PUCCH. The resource index $n^{(1)}_{PUCCH} = n_{CCE} + N^{(1)}_{PUCCH}$, wherein $n_{CCE}$ is the number of the first CCE used to send a corresponding PDCCH (i.e., PDCCH including the allocation of DL resources used to received downlink data corresponding to an ACK/NACK signal), and $N^{(1)}_{PUCCH}$ is a parameter that is informed of UE by a BS through a higher layer message.

Time, frequency, and code resources used to send an ACK/NACK signal are called ACK/NACK resources or PUCCH resources. As described above, an index of ACK/NACK resources (called an ACK/NACK resource index or PUCCH index) used to send an ACK/NACK signal on a PUCCH can be represented as at least one of an orthogonal sequence index i, a CS index $I_{cs}$, an RB index m, and an index for calculating the 3 indices. ACK/NACK resources can include at least one of an orthogonal sequence, a CS, a resource block, and a combination of them.

Figure 10:
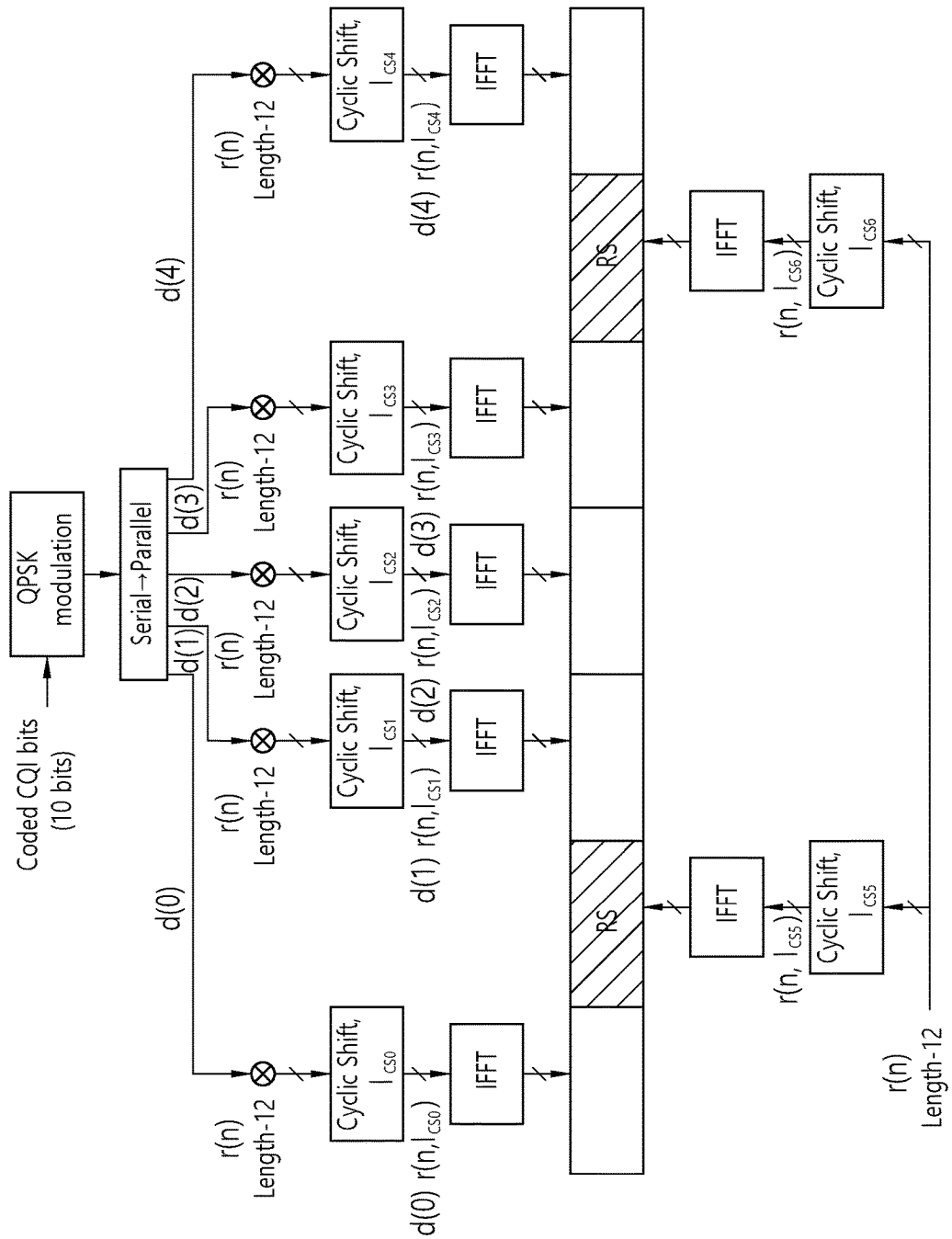
FIG. 10 shows the channel structure of PUCCH formats 2/2a/2b in a normal CP.

FIG. 10 shows the channel structure of the PUCCH formats 2/2a/2b in a normal CP.

Referring to FIG. 10, in a normal CP, OFDM symbols 1 and 5 (i.e., second and sixth OFDM symbols) are used to send a demodulation reference signal (DM RS), that is, an uplink reference signal, and the remaining OFDM symbols are used to send a CQI. In the case of an extended CP, an OFDM symbol 3 (fourth symbol) is used for a DM RS.

10 CQI information bits can be subject to channel coding at a 1/2 code rate, for example, thus becoming 20 coded bits. Reed-Muller code can be used in the channel coding. Next, the 20 coded bits are scramble and then subject to QPSK constellation mapping, thereby generating a QPSK modulation symbol (d(0) to d(4) in a slot 0). Each QPSK modulation symbol is modulated in a cyclic shift of a base RS sequence 'r(n)' having a length of 12, subject to IFFT, and then transmitted in each of 10 SC-FDMA symbols within a subframe. Uniformly spaced 12 CSs enable 12 different MSs to be orthogonally multiplexed in the same PUCCH RB. A base RS sequence 'r(n)' having a length of 12 can be used as a DM RS sequence applied to OFDM symbols 1 and 5.

Figure 11:
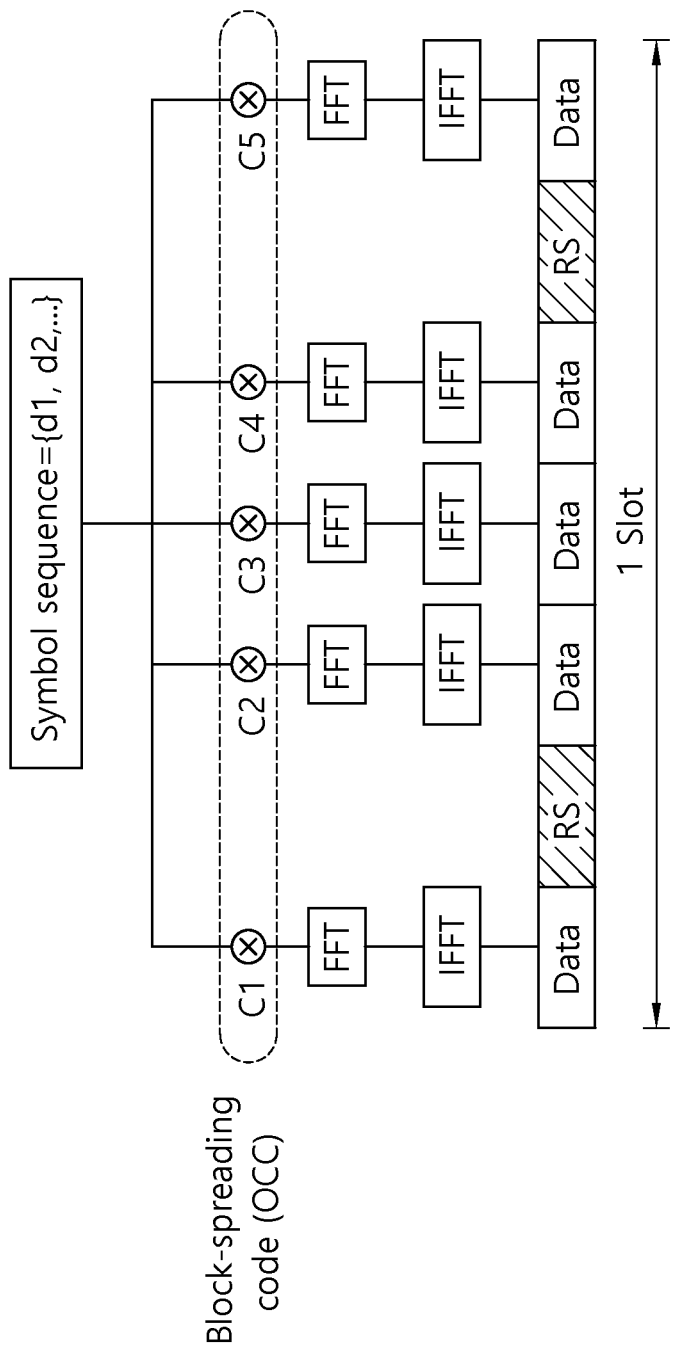
FIG. 11 illustrates the channel structure of a PUCCH format 3.

FIG. 11 shows an example of a channel structure of a PUCCH format 3.

Referring to FIG. 11, the PUCCH format 3 is a PUCCH format which uses a block spreading scheme. The block spreading scheme means a method of spreading a symbol sequence, which is obtained by modulating a multi-bit ACK/NACK, in a time domain by using a block spreading code.

In the PUCCH format 3, a symbol sequence (e.g., ACK/NACK symbol sequence) is transmitted by being spread in the time domain by using the block spreading code. An orthogonal cover code (OCC) may be used as the block spreading code. Control signals of several UEs may be multiplexed by the block spreading code. In the PUCCH format 2, a symbol (e.g., d(0), d(1), d(2), d(3), d(4), etc., of FIG. 7) transmitted in each data symbol is different, and UE multiplexing is performed using the cyclic shift of a constant amplitude zero auto-correlation (CAZAC) sequence. In contrast, in the PUCCH format 3, a symbol sequence including one or more symbols is transmitted in a frequency domain of each data symbol, the symbol sequence is spread in a time domain by using the block spreading code, and UE multiplexing is performed. An example in which 2 RS symbols are used in one slot has been illustrated in FIG. 11, but the present invention is not limited thereto. 3 RS symbols may be used, and an OCC having a spreading factor value of 4 may be used. An RS symbol may be generated from a CAZAC sequence having a specific cyclic shift and may be transmitted in such a manner that a plurality of RS symbols in the time domain has been multiplied by a specific OCC.

Figure 12:
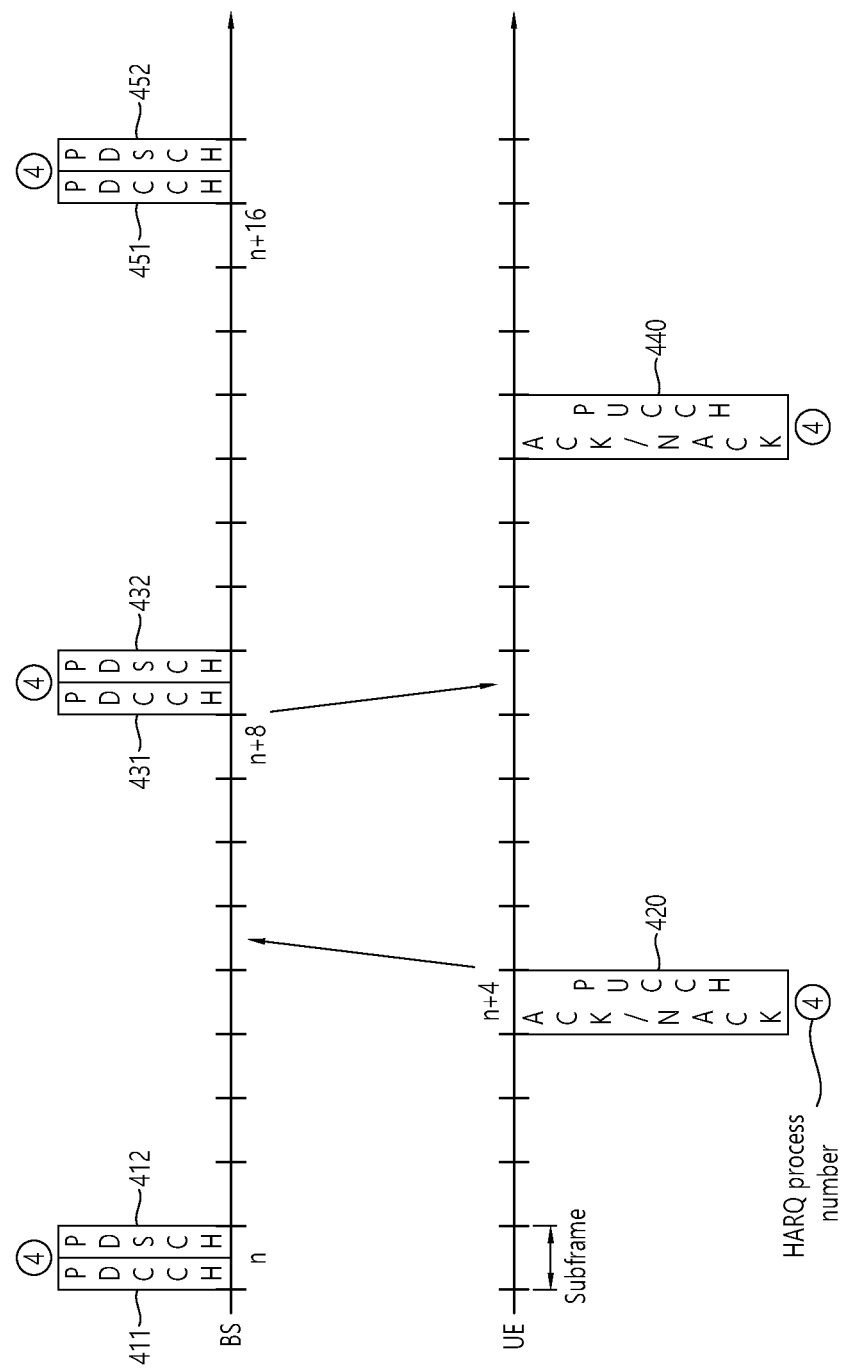
FIG. 12 illustrates a DL HARQ that is performed in a cell of 3GPP LTE.

FIG. 12 illustrates a DL HARQ that is performed in a cell of 3GPP LTE.

Referring to FIG. 12, a base station transmits a DL transmission block in subframe n onto a PDSCH 412 that is indicated by a DL resource allocation on a PDCCH 411 to a UE.

The UE transmits an ACK/NACK signal onto a PUCCH 420 in subframe n+4. As an example, the resource of the PUCCH 420 that is used for the transmission of ACK/NACK signal may be determined based on the resource of the PDCCH 411 (for example, the first CCE index that is used for the transmission of the PDCCH 411).

Even though the base station receives a NACK signal from the UE, it does not necessarily retransmit it in subframe n+8 unlike the UL HARQ. Here, an example is illustrated that a retransmission block is transmitted onto a PDSCH 432 that is indicated by the DL resource allocation on a PDCCH 431 in subframe n+9.

The UE transmits an ACK/NACK signal onto a PUCCH 440 in subframe n+13.

The UL HARQ includes processes such as a UL grant transmission of a BS, a PUSCH transmission of a UE (that is scheduled by the UL grant), transmitting ACK/NACK in response to the PUSCH through a PHICH by the BS and transmitting a new UL grant. An interval between the UL grant and the PUSCH and an interval between the PUSCH and the PHICH (or UL grant) of UL HARQ may be predetermined as 4 ms.

Now, a carrier aggregation system is described. The carrier aggregation system is also called a multiple carrier system.

A 3GPP LTE system supports a case where a DL bandwidth and a UL bandwidth are differently configured, but one component carrier (CC) is a precondition in this case. A 3GPP LTE system supports a maximum of 20 MHz and may be different in a UL bandwidth and a DL bandwidth, but supports only one CC in each of UL and DL A carrier aggregation (also called a bandwidth aggregation or a spectrum aggregation) supports a plurality of CCs. For example, if 5 CCs are allocated as the granularity of a carrier unit having a 20 MHz bandwidth, a maximum of a 100 MHz bandwidth may be supported.

Figure 13:
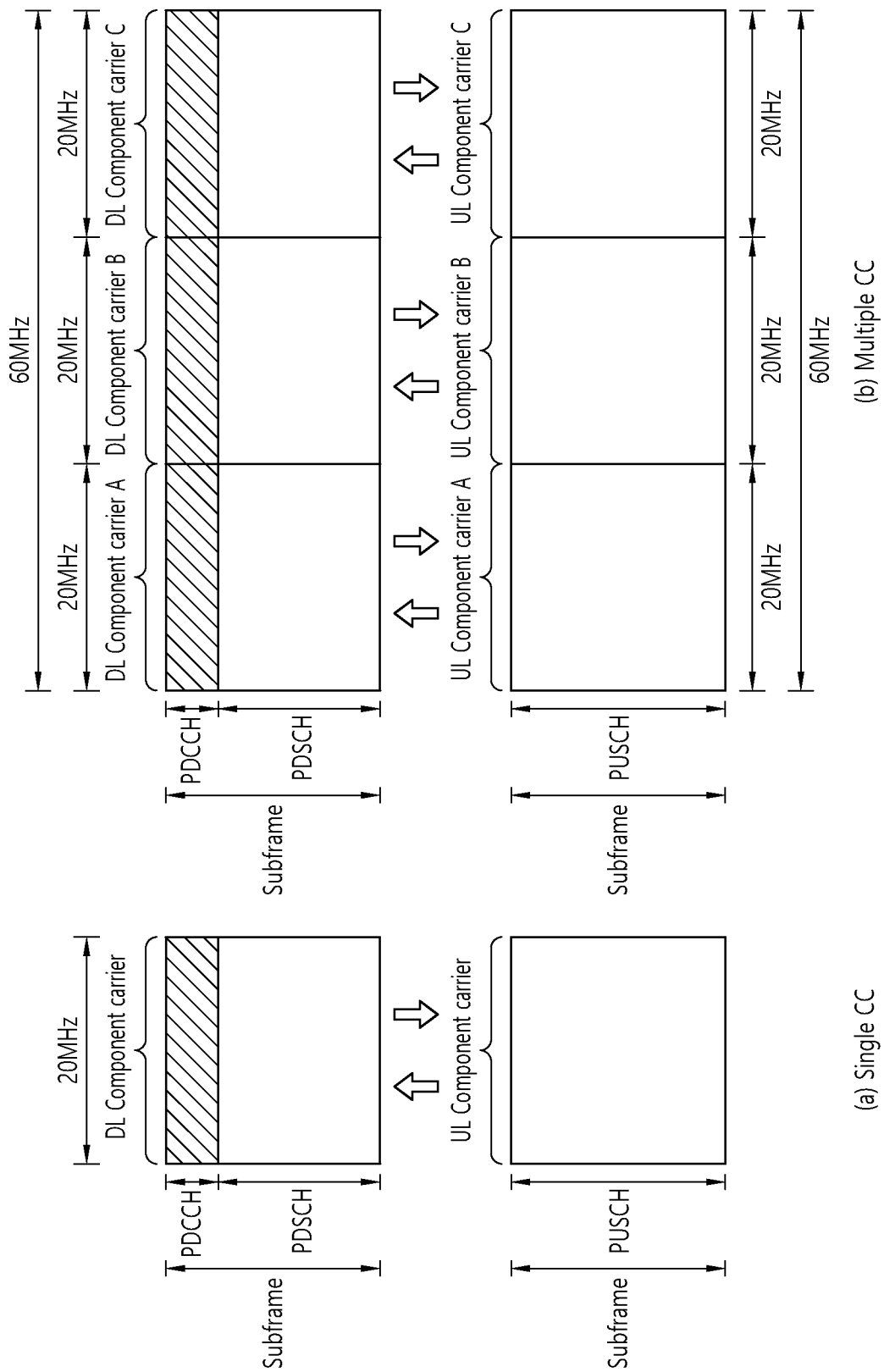
FIG. 13 shows an example of a comparison between a single carrier system and a carrier aggregation system.

FIG. 13 shows an example of a comparison between a single carrier system and a carrier aggregation system.

A carrier aggregation system (FIG. 13(b)) has been illustrated as including three DL CCs and three UL CCs, but the number of DL CCs and UL CCs is not limited. A PDCCH and a PDSCH may be independently transmitted in each DL CC, and a PUCCH and a PUSCH may be independently transmitted in each UL CC. Or, a PUCCH may be transmitted only through a specific UL CC.

Since three pairs of DL CCs and UL CCs are defined, it can be said that a UE is served from three serving cells. Hereinafter, a cell which is configured to provide a service to a user equipment is referred to a serving cell.

The UE may monitor PDCCHs in a plurality of DL CCs and receive DL transport blocks through the plurality of DL CCs at the same time. The UE may send a plurality of UL transport blocks through a plurality of UL CCs at the same time.

A pair of a DL CC # A and a UL CC # A may become a first serving cell, a pair of a DL CC # B and a UL CC # B may become a second serving cell, and a DL CC # C and a UL CC # C may become a third serving cell. Each serving cell may be identified by a cell index (CI). The CI may be unique within a cell or may be UE-specific.

The serving cell may be divided into a primary cell and a secondary cell. The primary cell is a cell on which the UE performs an initial connection establishment procedure or initiates a connection re-establishment procedure, or a cell designated as a primary cell in a handover process. The primary cell is also called a reference cell. The secondary cell may be configured after an RRC connection has been established and may be used to provide additional radio resources. At least one primary cell is always configured, and a secondary cell may be added/modified/released in response to higher layer signaling (e.g., an RRC message). The CI of the primary cell may be fixed. For example, the lowest CI may be designated as the CI of the primary cell.

The primary cell includes a downlink primary component carrier (DL PCC) and an uplink PCC (UL PCC) in view of a CC. The secondary cell includes only a downlink secondary component carrier (DL SCC) or a pair of a DL SCC and a UL SCC in view of a CC. Hereinafter, the term, 'cell' may be mixed with the term 'component carrier (CC)'.

As described above, the carrier aggregation system may support a plurality of CCs, that is, a plurality of serving cells unlike the single carrier system.

Such a carrier aggregation system may support cross-carrier scheduling. The cross-carrier scheduling is a scheduling method capable of performing resource allocation of a PDSCH transmitted through a different component carrier through a PDCCH transmitted through a specific component carrier and/or resource allocation of a PUSCH transmitted through other component carriers except for a component carrier fundamentally linked with the specific component carrier. That is, the PDCCH and the PDSCH may be transmitted through different DL CCs, and a PUSCH may be transmitted through a UL CC different from a UL CC linked with a DL CC to which a PDCCH including a UL is transmitted. As described above, in a system for supporting the cross-carrier scheduling, the PDCCH needs a carrier indicator indicating that PDSCH/PUSCH are transmitted through a certain DL CC/UL CC. Hereinafter, a field including the carrier indicator refers to a carrier indication field (CIF).

The carrier aggregation system that supports the cross-carrier scheduling may include a carrier indication field (CIF) to the conventional downlink control information (DCI). In a system that supports the cross-carrier scheduling, for example, LTE-A system, 3 bits may be extended since the CIF is added to the conventional DCI format (i.e., the DCI format used in LTE), and the PDCCH structure may reuse the conventional coding method, resource allocation method (i.e., resource mapping based on the CCE), and the like.

A BS may set a PDCCH monitoring DL CC (monitoring CC) group. The PDCCH monitoring DL CC group is configured by a part of all aggregated DL CCs. If the cross-carrier scheduling is configured, the UE performs PDCCH monitoring/decoding for only a DL CC included in the PDCCH monitoring DL CC group. That is, the BS transmits a PDCCH with respect to a PDSCH/PUSCH to be scheduled through only the DL CCs included in the PDCCH monitoring DL CC group. The PDCCH monitoring DL CC group may be configured in a UE-specific, UE group-specific, or cell-specific manner.

Non-cross carrier scheduling (NCSS) is a scheduling method capable of performing resource allocation of a PDSCH transmitted through a specific component carrier through a PDCCH transmitted through the specific component carrier and/or resource allocation of a PDSCH transmitted through a component carrier fundamentally linked with the specific component carrier.

ACK/NACK transmission for HARQ in 3GPP LTE Time Division Duplex (TDD) is described below.

In TDD, unlike in a Frequency Division Duplex (FDD), a DL subframe and an UL subframe coexist in one radio frame. In general, the number of UL subframes is smaller than that of DL subframes. Accordingly, in preparation for a case where UL subframes for sending an ACK/NACK signal are not sufficient, a plurality of ACK/NACK signals for DL transport blocks received in a plurality of DL subframes is transmitted in one UL subframe.

In accordance with section 10.1 of 3GPP TS 36.213 V8.7.0 (2009-05), two ACK/NACK modes: ACK/NACK bundling and ACK/NACK multiplexing are initiated.

In ACK/NACK bundling, UE sends ACK if it has successfully decoded all received PDSCHs (i.e., DL transport blocks) and sends NACK in other cases. To this end, ACK or NACKs for each PDSCH are compressed through logical AND operations.

ACK/NACK multiplexing is also called ACK/NACK channel selection (or simply channel selection). In accordance with ACK/NACK multiplexing, UE selects one of a plurality of PUCCH resources and sends ACK/NACK.

Table below shows DL subframes n-k associated with an UL subframe n according to an UL-DL configuration in 3GPP LTE, wherein k∈K and M is the number of elements of a set K.

The former may be referred to a cross carrier scheduling and the latter may be referred to a non-cross carrier scheduling.

Hereinafter, the CC on which the control signal is transmitted may be referred to a scheduling CC, and the remaining CCs may be referred to as scheduled CCs. In the non-cross carrier scheduling, the scheduling CC and the scheduled CC are the same, and in the cross carrier scheduling, the scheduling CC and the scheduled CC may be different from each other.

The scheduling CC includes a primary CC (PCC), representatively. The PCC is used as a CC that transmits UL control signal. A CC which is not the PCC is referred to a SCC. Hereinafter, the PCC is used as a representative example of the scheduling CC and the SCC is used as a representative example of the scheduled CC, but not limited thereto.

The UE operated in LTE-A Rel. 10 was available to aggregate only CCs having the same frame structure. In addition, in case of aggregating a plurality of TDD CCs, only the CCs having the same UL-DL configuration may be used. And in case that the non-cross carrier scheduling is used, the timing relation defined in a CC is simply extended and applied to a plurality of CCs.

However, in a wireless communication system of the next generation, the aggregated CCs may use the frame structures different from each other. For example, the FDD CC and the TDD CC may be aggregated.

Figure 14:
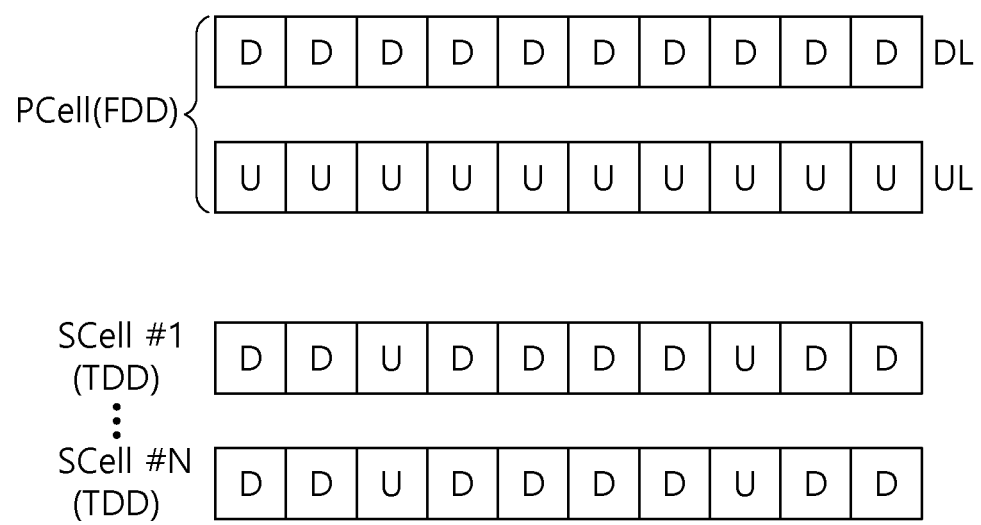
FIG. 14 illustrates an example in which a plurality of serving cells uses different types of radio frames in a wireless communication system.

FIG. 14 illustrates an example in which a plurality of serving cells uses different types of radio frames in a wireless communication system.

Referring to FIG. 14, a primary cell (PCell) and a plurality of secondary cells (SCell #1, . . . , SCell # N) may be configured in a UE. In this case, the primary cell can operate in FDD and use an FDD frame, and the secondary cells may operate in TDD and use TDD frames. The same UL-DL configuration may be used in the plurality of secondary cells. A DL subframe (indicated by D) and an UL subframe (indicated by U) are present in a 1:1 relationship in the primary cell, but a DL subframe and an UL subframe may be present in ratios not 1:1 in the secondary cells.

Figure 15:
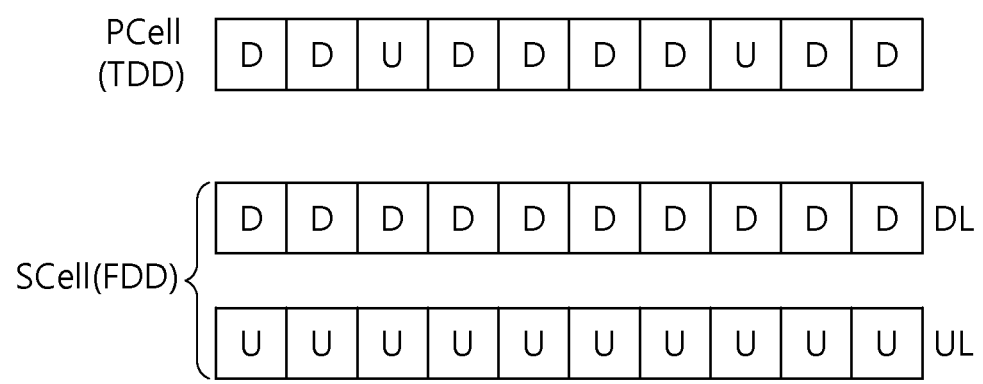
FIG. 15 illustrates another example in which a plurality of serving cells uses different types of radio frames in a wireless communication system.

FIG. 15 illustrates another example in which a plurality of serving cells uses different types of radio frames in a wireless communication system.

Referring to FIG. 15, a primary cell (PCell) that uses a TDD frame and a secondary cell (SCell) that uses a FDD frame may be configured to a UE.

TABLE 5

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Hereinafter, the present invention will be described.

In LTE-A Rel. 10 system, a UE may transmit and receive data through a plurality of cells (CCs) which is aggregated. At the moment, the control signal for scheduling/controlling a plurality of cells may be transmitted through only a specific UL CC or transmitted through a DL CC of each cell.

Meanwhile, although TDD cells are aggregated, the UL-DL configuration applied to each TDD CC may be different. In such a case, it may be difficulty to apply the HARQ timing which was applied to a single CC in the same way. For example, it is assumed that TDD CC 1 is used for the PCC and TDD CC2 is used for the SCC, and TDD CC 1 and 2 use different UL-DL configurations. It is assumed that according to the UL-DL configuration applied to TDD CC 2, when data is received in DL subframe N1 of TDD CC 2, the HARQ timing is determined such that ACK/NACK in response to this is transmitted in UL subframe N2. Since the UL-DL configurations of TDD CC 1 and 2 are different, the subframe of TDD CC 1 that corresponds to the UL subframe N2 may be a DL subframe, and as a result, ACK/NACK may not be transmitted through TDD CC 1.

That is, with respect to the case that only one cell is present, the timing between the reception of UL grant and the PUSCH scheduled by the UL grant may not be applied to the case that the TDD CC using frame types different with each other or using UL-DL configurations different with each other as it is. For example, this is because the subframe that should receive a UL grant according to the timing of the case only one cell is present may be setup as a UL subframe in a situation of the carrier aggregation. Accordingly, it is required to reconfigure the HARQ timing.

Hereinafter, it is exemplified that the primary cell is a cell that transmits a PUCCH, but the secondary cell may also be a cell that transmits a PUCCH. In addition, it is exemplified that the scheduling cell is the primary cell in a cross carrier scheduling, but not limited thereto.

In case of an FDD DL HARQ timing, the number of DL subframes (hereinafter, this is referred to M) that corresponds to one UL subframe is 1:1 relationship (the correspondence means that the PDSCH received in the DL subframe or ACK/NACK for a transport block is transmitted in the UL subframe). Accordingly, DAI is not required between a DL scheduling DCI and a UL scheduling DCI.

On the other hand, in case of a TDD DL HARQ timing, there is a case that the UL subframe and the DL subframe have 1:M (M>1) relationship in case of UL-DL configurations 1, 2, 3, 4, 5 and 6. That is, one UL subframe may correspond to a plurality of DL subframes. Accordingly, DAI is required between a DL scheduling DCI and a UL scheduling DCI.

In case of UL-DL configuration 0, since all DL subframes may correspond to one UL subframe, DAI is not required. Instead, since the number of UL subframes is more than the number of DL subframes when performing UL scheduling, a plurality of UL subframe should be scheduled in one DL subframe, and for this, a UL index is existed.

However, since only M=1 relation is existed in UL-DL configuration 6, DAI is not required. However, in the conventional art, it is transmitted with DAI=1 for all cases. In the present invention, DAI may be removed in UL-DL configuration 6.

The DAI may be distinguished by a DL DAI included in the DL DCI and a UL DAI included in the UL DCI. The DL DAI is required for signaling order and number of control channels and data channels scheduled in DL. The UL DAI is required, in case that DL HARQ-ACK is piggyback to a PUSCH, for signaling the sum of this.

Hereinafter, a method of DCI configuration for an FDD secondary cell will be described. For the convenience of description, it is assumed that a primary cell is a PUCCH transport cell for a secondary cell in case of DL HARQ, and is a scheduling cell for a secondary cell which is scheduled in case of UL HARQ. However, this is not limited thereto.

I. Aggregation of an FDD Primary Cell and a TDD Secondary Cell

1. The case that the non-cross carrier scheduling being setup

1) DL HARQ timing for the TDD secondary cell: The FDD HARQ timing for the FDD primary cell and the TDD HARQ timing for the TDD secondary cell itself may be applied. This is because the transmissions in DL direction and UL direction are available in all subframes since the primary cell is the FDD cell.

2) UL HARQ timing for the TDD secondary cell: Only the TDD HARQ timing of the TDD secondary cell itself may be applied.

In case of UL HARQ timing, only the TDD HARQ timing is available to be applied. In this case, DAI is not required for all UL-DL configuration, and in case of UL-DL configuration 0, a UL index is required. Accordingly, the following configuration is available.

i) In all UL-DL configurations, it is configured that the TDD HARQ timing of the TDD secondary cell itself is applied to the DL HARQ timing, and the TDD HARQ timing of the TDD secondary cell itself is also applied to the UL HARQ timing.

At the moment, similar to the conventional TDD, DAI and UL index may be configured.

ii) In all UL-DL configurations, it is configured that the FDD HARQ timing for the FDD secondary cell is applied to the DL HARQ timing, and the TDD HARQ timing for the TDD secondary cell is applied to the UL HARQ timing.

At the moment, in UL-DL configurations 1, 2, 3, 4, 5 and 6, the DCI may not include a DL/UL DAI and a UL index, and even though DCI includes a DL/UL DAI and a UL index, they may not be utilized. In UL-DL configuration 0, the UL DCI includes a UL index, and the DL DCI may not include a DL DAI. Even though the DL DCI includes a DL DAI, the DL DAI may not be utilized.

iii) In UL-DL configurations 1, 2, 3, 4, 5 and 6, the FDD HARQ timing for the FDD primary cell is applied to the DL HARQ timing, and the TDD HARQ timing for the TDD secondary cell is applied to the UL HARQ timing.

At the moment, in UL-DL configuration 0, the TDD HARQ timing for the TDD secondary cell may be applied to the DL HARQ timing, and the TDD HARQ timing for the TDD secondary cell may also be applied to the UL HARQ timing.

In UL-DL configurations 1, 2, 3, 4, 5 and 6, the DCI may not include a DL/UL DAI and a UL index, and even though DCI includes a DL/UL DAI and a UL index, they may not be utilized. In UL-DL configuration 0, the UL DCI includes a UL index, and the DL DCI may not include a DL DAI. Even though the DL DCI includes a DL DAI, the DL DAI may not be utilized.

2. The case that the cross carrier scheduling being setup

1) DL HARQ timing for the TDD secondary cell: The FDD HARQ timing for the FDD primary cell and the TDD HARQ timing for the TDD secondary cell itself may be applied. This is because the transmissions in DL direction and UL direction are available in all subframes since the primary cell is the FDD cell.

2) UL HARQ timing for the TDD secondary cell: In all UL-DL configurations, the TDD HARQ timing of the TDD secondary cell itself may be applied, or exceptionally, in UL-DL configuration 0, a new HARQ timing of 10 subframes (10 ms) cycle may be applied.

With respect to UL-DL configuration 0, when applying the UL HARQ process of 10 ms cycle, a UL index is not required since M=1. In this case, in all UL-DL configurations, DAI is not required, and in UL-DL configuration 0, a UL index is also not required. Accordingly, the following configuration is available.

i) In all UL-DL configurations, it is configured that the TDD HARQ timing of the TDD secondary cell itself is applied to the DL HARQ timing, and the TDD HARQ timing of the TDD secondary cell itself is also applied to the UL HARQ timing. At the moment, similar to the conventional TDD, a DAI and a UL index may be configured.

ii) In all UL-DL configurations, it is configured that the FDD HARQ timing for the FDD secondary cell is applied to the DL HARQ timing, and the TDD HARQ timing for the TDD secondary cell is applied to the UL HARQ timing.

At the moment, in UL-DL configurations 1, 2, 3, 4, 5 and 6, the DCI may not include a DL/UL DAI and a UL index, and even though DCI includes a DL/UL DAI and a UL index, they may not be utilized. In UL-DL configuration 0, the UL DCI includes a UL index, and the DL DCI may not include a DL DAI. Even though the DL DCI includes a DL DAI, the DL DAI may not be utilized.

iii) In UL-DL configurations 1, 2, 3, 4, 5 and 6, the FDD HARQ timing for the FDD primary cell is applied to the DL HARQ timing, and the TDD HARQ timing for the TDD secondary cell is applied to the UL HARQ timing.

At the moment, in UL-DL configuration 0, the TDD HARQ timing for the TDD secondary cell may be applied to the DL HARQ timing, and the TDD HARQ timing for the TDD secondary cell may also be applied to the UL HARQ timing.

In UL-DL configurations 1, 2, 3, 4, 5 and 6, the DCI may not include a DL/UL DAI and a UL index, and even though DCI includes a DL/UL DAI and a UL index, they may not be utilized. In UL-DL configuration 0, the UL DCI includes a UL index, and the DL DCI may not include a DL DAI. Even though the DL DCI includes a DL DAI, the DL DAI may not be utilized.

iv) In UL-DL configurations 1, 2, 3, 4, 5 (, 6), it may be configured that the FDD HARQ timing for the FDD primary cell is applied to the DL HARQ timing, and the TDD HARQ timing for the TDD secondary cell is applied to the UL HARQ timing.

Or, in UL-DL configuration 0 (, 6), the FDD HARQ timing for the FDD secondary cell may be applied to the DL HARQ timing, and a new HARQ timing of 10 ms cycle for the TDD secondary cell may be applied to the UL HARQ timing.

UL-DL configuration 6 is applied to be included in either one of the former or the latter.

In all of UL-DL configurations 1, 2, 3, 4, 5 and 6, the DCI may not include a DAI and a UL index, and even though DCI includes a DAI and a UL index, they may not be utilized. Distinctively, in UL-DL configuration 0, the UL DCI does not include a UL index, and even though the UL DCI includes a UL index, the UL index may not be utilized. And the DL DCI may not include a DL DAI, and even though the DL DCI includes a DL DAI, the DL DAI may not be utilized.

II. Aggregation of an TDD Primary Cell and a FDD Secondary Cell

1. The case that the non-cross carrier scheduling being setup

1) DL HARQ timing for the FDD secondary cell: The TDD HARQ timing for the TDD primary cell or the reference TDD HARQ timing may be applied. The FDD HARQ timing for the secondary cell itself may not be applied. This is because the transmission in UL direction may not supported in a part of subframes of the TDD primary cell.

2) UL HARQ timing for the FDD secondary cell: It is available to apply the FDD HARQ timing of the secondary cell itself, and the TDD HARQ timing of the primary cell may also be applied. Here, the FDD HARQ timing of the secondary cell itself means that a time interval between the UL grant reception and the PUSCH transmission is 4 ms. A time interval between the PUSCH transmission and the PHICH or UL grant reception may not be 4 ms, which is different from that of FDD (e.g., it may be 6 ms). In this case, since only one UL subframe is scheduled in one DL subframe, a UL index is not required for UL-DL configuration 0.

In case of DL HARQ timing, only the TDD HARQ timing is available to be applied. In this case, DAI is required for UL-DL configurations 1, 2, 3, 4, 5 (, 6), and in case of UL-DL configuration 0, a UL index is not required. Accordingly, the following configuration is available.

i) In all UL-DL configurations, the HARQ timing of the TDD secondary cell may be applied to the DL HARQ timing, and the HARQ timing of the TDD secondary cell may also be applied to the UL HARQ timing. At the moment, similar to the conventional TDD, DAI and UL index may be configured.

ii) In all UL-DL configurations, the HARQ timing of the TDD primary cell may be applied to the DL HARQ timing, and the HARQ timing of the FDD secondary cell may be applied to the UL HARQ timing. In UL-DL configurations 1, 2, 3, 4, 5 (, 6), the DCI may include DAI, and in UL-DL configuration 0, the UL DCI may include a UL index. Even though the UL DCI includes a UL index, the UL index may not be utilized. And, the DL DCI may not include a DL DAI. Even though the DL DCI includes a DL DAI, the DL DAI may not be utilized.

2. The case that the cross carrier scheduling being setup

1) DL HARQ timing for the FDD secondary cell: Only the TDD HARQ timing for the primary cell may be applied, and the FDD HARQ timing of the secondary cell itself may not be applied. This is because the transmission in UL direction may not supported in a part of subframes of the TDD primary cell.

2) UL HARQ timing for the FDD secondary cell: It is available to apply the TDD HARQ timing of the primary cell, the reference TDD HARQ timing or the FDD HARQ timing of the secondary cell itself may be applied. Here, the FDD HARQ timing of the secondary cell itself means that a time interval between the UL grant reception and the PUSCH transmission is 4 ms. A time interval between the PUSCH transmission and the PHICH or UL grant reception may not be 4 ms, which is different from that of FDD (e.g., it may be 6 ms). In this case, since only one UL subframe is scheduled in one DL subframe, a UL index is not required for UL-DL configuration 0.

i) In all UL-DL configurations, the TDD HARQ timing of the TDD secondary cell may be applied to the DL HARQ timing, and the TDD HARQ timing of the TDD secondary cell may also be applied to the UL HARQ timing. In this case, similar to the conventional TDD, a DAI and a UL index may be configured.

ii) In all UL-DL configurations, the TDD HARQ timing of the TDD secondary cell may be applied to the DL HARQ timing, and the HARQ timing of the FDD secondary cell may be applied to the UL HARQ timing. In UL-DL configurations 1, 2, 3, 4, 5 (, 6), the DCI may include a DAI, and in UL-DL configuration 0, and the UL DCI may not include a UL index. Even though the UL DCI includes a UL index, the UL index may not be utilized. And, the DL DCI may not include a DL DAI. Even though the DL DCI includes a DL DAI, the DL DAI may not be utilized.

iii) In all UL-DL configurations, the TDD HARQ timing of the TDD secondary cell may be applied to the DL HARQ timing, and even in the combination except UL-DL configuration 0, the UL HARQ timing may perform scheduling a plurality of UL subframes in one DL subframe.

In UL-DL configurations 1, 2, 3, 4, 5 (, 6), the DCI may include DAI, and the UL DCI includes a UL index. In UL-DL configuration 0, a DAI may not be included. Even though a DAI is included, the DAI may not be utilized. The UL index was 2 bits in the conventional art, but may be extended to 3 bits in the embodiment.

iv) In all UL-DL configurations, the TDD HARQ timing of the TDD secondary cell may be applied to the DL HARQ timing, and the HARQ timing of the reference TDD secondary cell may be applied to the UL HARQ timing.

In UL-DL configurations 1, 2, 3, 4, 5 (, 6), the DL DCI may include DAI, and the UL DCI includes a UL DAI. In UL-DL configuration 0, the DL DCI may not include a DAI. Even though the DL DCI includes a DAI, the DAI may not be utilized. In UL-DL configuration 0, the UL DCI includes and applies a UL index. At the moment, in order not to elongate a length, the UL DCI may not include a UL DAI. That is, in case of UL-DL configurations 1, 2, 3, 4 and 5, the DL subframe and the UL subframe have M:1 relationship and a UL DAI may be utilized, but which may be excluded. ACK/NACK bit which is the same number when transmitting a PUCCH may be transmitted through a PUSCH.

In the procedure described above, in case that a DAI is required, the DL DAI must be transmitted. On the other hand, even though a DAI is required, the UL DAI may not be transmitted. At the moment, it may be operated by assuming that the UL DAI value is the maximum value that scheduling is available. Accordingly, even though transmitting the DL DAI, the UL DAI may not be transmitted. The case of not transmitting the UL DAI may be applied to only the case that a UL index is included.

In a situation that UL-DL configuration 5 is applied to reference HARQ timing in DL, if UL-DL configuration 0 is applied to reference HARQ timing in UL, the UL index is introduced and the UL DAI is removed. In this case, ACK/NACK which is piggyback to a PUSCH is configured by assuming that the UL DAI is 1, or ACK/NACK is piggyback to the PUSCH with the same ACK/NACK bit number transmitted to a PUCCH since it is detected that reception of the UL DAI is failed.

In case of DL HARQ timing, the HARQ timing of the TDD primary cell may be substituted by the reference TDD HARQ timing. Furthermore, in case that the reference configuration is applied, the operation of DAI is defined according to the reference configuration of the DL HARQ process. The operation of UL index is defined according to the reference configuration of the UL HARQ process. The reference configuration may be the HARQ timing for a primary cell or the HARQ timing of a scheduling cell.

In the above description, with respect to the UL HARQ in case that the cross carrier scheduling is applied, it is premised that the primary cell and the scheduling cell are identical. If the primary cell and the scheduling cell are different, the primary cell is substituted by the scheduling cell in the technique to the UL HARQ.

Hereinafter, the embodiments of configuring DCI according to the HARQ timing in aggregating a TDD cell and an FDD cell will be described.

First, the HARQ timing that can be applied to the aggregation between a TDD cell and a FDD cell may be arranged as follows.

1) The DL HARQ timing in aggregating an FDD primary cell and a TDD secondary cell (i.e., ACK/NACK transmission timing on a PDSCH reception and the PDSCH)

The non-cross carrier scheduling is according to the DL HARQ timing of the FDD primary cell. The cross carrier scheduling is also according to the DL HARQ timing of the FDD primary cell.

2) The UL HARQ timing in aggregating an FDD primary cell and a TDD secondary cell (i.e., a PUSCH transmission timing which is scheduled by a UL grant (UL DCI) reception and the UL grant, a PHICH reception timing that includes the PUSCH transmission and ACK/NACK to the PUSCH.)

First, the non-cross carrier scheduling is according to the UL HARQ timing of the TDD secondary cell.

Next, in the cross carrier scheduling, the operation is as follows.

i) The scheduling cell, which is an FDD cell, may be according to the UL HARQ timing of a scheduled TDD cell. In the scheduling cell, which is a TDD cell, the reference UL-DL configuration is deduced from the UL-DL configuration of the scheduled cell and the scheduling cell, and accordingly, may be according to the UL HARQ timing.

ii) For the scheduling cell, which is an FDD cell, it may be implemented that an interval between a UL grant reception and a PUSCH transmission is 4 ms, and an interval between a PUSCH transmission and a PHICH reception is 6 ms. In the scheduling cell, which is a TDD cell, the reference UL-DL configuration is deduced from the UL-DL configuration of the scheduled cell and the scheduling cell, and accordingly, may be according to the UL HARQ timing.

3) The DL HARQ timing in aggregating a TDD primary cell and an FDD secondary cell (i.e., ACK/NACK transmission timing on a PDSCH reception and the PDSCH)

First, for the non-cross carrier scheduling, i) it may be implemented to follow the DL HARQ timing of a TDD primary cell. However, if there is a DL subframe of which DL HARQ timing is not defined in the TDD primary cell, the DL subframe may be according to a new DL HARQ timing. Or, a new DL HARQ timing of which number of DL subframes is more than the existing TDD cell may be fully used. ii) the DL HARQ timing may be determined according to the reference UL-DL configuration which is defined for the FDD secondary cell.

Next, for the cross carrier scheduling, the method i) and ii) in the non-cross carrier scheduling described above may be used in the same way or the cross carrier scheduling may be according to only the DL HARQ timing of the TDD primary cell.

4) The UL HARQ timing in aggregating an TDD primary cell and a FDD secondary cell (i.e., a PUSCH transmission timing which is scheduled by a UL grant (UL DCI) reception and the UL grant, a PHICH reception timing that includes the PUSCH transmission and ACK/NACK to the PUSCH.)

First, the non-cross carrier scheduling is according to the UL HARQ timing of the FDD cell.

Next, in the cross carrier scheduling, the operation is as follows.

i) The scheduling cell, which is a TDD cell, may be according to the UL HARQ timing of a scheduling cell. The scheduling cell, which is an FDD cell, is according to the FDD UL HARQ timing.

ii) For the scheduling cell, which is a TDD cell, it may be implemented that an interval between a UL grant reception and a PUSCH transmission is 4 ms, and an interval between a PUSCH transmission and a PHICH reception is 6 ms. The scheduling cell, which is an FDD cell, is according to the FDD UL HARQ timing.

As described above, when a TDD cell and an FDD cell are aggregated, various combinations occur depending on which sort of cell is a primary cell and which sort of cell is a secondary cell, and whether the cross carrier scheduling is applied, and each of the DL/UL HARQ timing may be determined to each combination. For the case of each combination described above, below is described how the DCI field is configured, which configures the DL/UL grant.

Hereinafter, although a field, "no field" is existed, it means that the corresponding field is not used for the original use.

1. DL DCI format in aggregating an FDD primary cell and a TDD secondary cell

1) In any cases of the cross carrier scheduling or the non-cross carrier scheduling, the DL DCI format is determined based on the FDD DCI format. That is, the HARQ process number field of 3 bits is used, and the DL DAI field is disposed by "no field".

In case that non-periodic SRS is configured, the non-periodic SRS triggering field of 1 bit is added in DCI format 2B/2C/2D.

2. UL DCI format in aggregating an FDD primary cell and a TDD secondary cell

1) In the non-cross carrier scheduling, the UL DCI format is determined based on the FDD DCI format. The UL DAI field and the DL DAI field are disposed by "no field". The UL index field of 2 bits is added to UL-DL configuration 0.

2) In cross carrier scheduling, a scheduling cell may be operated in the same way of the non-cross carrier scheduling, regardless of the scheduling cell being a TDD cell or a FDD cell.

Or, only in case that a scheduling cell is a TDD cell, the scheduling cell may be operated in the same way of the non-cross carrier scheduling. If the scheduling cell is an FDD cell, the scheduling cell may configure the UL DCI in the same way as the FDD UL DCI format. That is, the UL DAI field and the DL DAI field are disposed by "no field".

3. DL DCI format in aggregating a TDD primary cell and an FDD secondary cell

1) For both the cross carrier scheduling and the non-cross carrier scheduling, i) the DL DCI may be configured based on the TDD DL DCI format. That is, the HARQ process number field may be configured by 4 bits and the DL DAI field may be configured by 2 bits. For DCI format 2B/2C/2D, the SRS triggering field is disposed by "no field". Or, ii) the DL DCI may be configured based on the TDD DL DCI format (using a HARQ process number field of 4 bits), but the DL DAI field of 2 bits may be selectively included according to the reference UL-DL configuration. It may be configured on which reference UL-DL configuration, the DL DAI field of 2 bits is included. Or, the UL DAI field of 2 bit may be included without regard to the reference UL-DL configuration. For DCI format 2B/2C/2D, the SRS triggering field is disposed by "no field".

4. UL DCI format in aggregating a TDD primary cell and an FDD secondary cell

1) For the non-cross carrier scheduling, i) it may be implemented to follow the DL HARQ timing of a TDD primary cell. However, if there is a DL subframe of which DL HARQ timing is not defined in the TDD primary cell, the DL subframe may be according to a new DL HARQ timing. In this case, the UL DCI may be configured based on the TDD UL DCI format. For example, the UL DAI field of 2 bits may be included. The UL index field is disposed by "no field". Or, ii) the DL DCI may be configured based on the TDD DL DCI format, but the DL DAI field of 2 bits may be selectively included according to the reference UL-DL configuration, and the corresponding reference UL-DL configuration may be configured by a BS. Or, the UL DAI field of 2 bits may be included without regard to the reference UL-DL configuration. The UL index field is disposed by "no field".

2) For the cross carrier scheduling, i) if a scheduling cell is an FDD cell, the UL DCI may be configured in the same way of the non-cross carrier scheduling. If a scheduling cell is a TDD cell, the UL DCI is configured in the same way of the TDD UL DCI format. That is, the UL DAI field of 2 bits is included. If UL-DL configuration 0 is setup to a scheduling cell, the UL DAI field is substituted by the UL index field of 2 bits. Or, ii) the UL DCI format may be configured in the same way of the non-cross carrier scheduling regardless of the scheduling cell being an FDD cell or a TDD cell.

Figure 16:
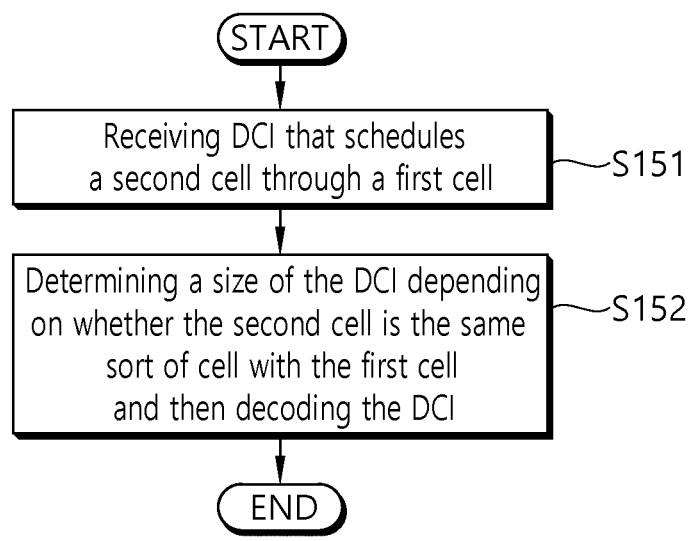
FIG. 16 illustrates a DCI decoding method according to an embodiment of the present invention.

FIG. 16 illustrates a DCI decoding method according to an embodiment of the present invention.

Referring to FIG. 16, a UE receives a DCI which is scheduling a second cell through a first cell (S151).

The UE may determine a size of the DCI depending on whether the second cell is the same sort of cell and then decode the DCI (S152).

Here, the first cell is a primary cell that performs an initial connection establishment procedure or a connection reestablishment procedure between the UE and a BS, and the second cell is a secondary cell which is additionally allocated to the UE in addition to the primary cell.

In a carrier aggregation in which hetero cells are aggregated, the first cell may be an FDD cell that uses a frequency division duplex (FDD) frame, and the second cell may be a TDD cell that uses a time division duplex (TDD) frame. At the moment, the DCI may include a specific field that has bit sizes different with each other in scheduling the FDD cell or the TDD cell which is solely used. The specific field may have a bit size which is the same when scheduling the FDD cell which is solely used, when scheduling the TDD cell. The specific field may be a field that includes a hybrid automatic repeat request (HARQ) process number. The HARQ process number is configured by 3 bits when scheduling the FDD cell which is solely used, and by 4 bits when scheduling the TDD cell which is solely used. On the other hand, in a situation in which hetero cells are aggregated like the above example, in case that the DCI that schedules the TDD cell through the FDD cell is transmitted, the DCI has a bit size (3 bits) which is the same when scheduling the FDD cell which is solely used.

For another example, the first cell may be a TDD cell that uses a time division duplex (TDD) frame, and the second cell may be an FDD cell that uses a frequency division duplex (FDD) frame. In this case, the DCI may include a specific field that has bit sizes different with each other in scheduling the FDD cell or the TDD cell which is solely used. The specific field may have a bit size which is the same when scheduling the TDD cell which is solely used, when scheduling the FDD cell. The specific field may be a hybrid automatic repeat request (HARQ) process number. Similar to another example above, in a situation in which hetero cells are aggregated like the above example, in case that the DCI that schedules the FDD cell through the TDD cell is transmitted, the DCI has a bit size (4 bits) which is the same when scheduling the TDD cell which is solely used.

Let us consider a case in which the cross carrier scheduling is applied, and an FDD primary cell and a TDD secondary cell are aggregated. At the moment, it is assumed that a PUCCH is transmitted only to the primary cell.

The DL/UL DCI for the TDD secondary cell is transmitted to the FDD primary cell. At the moment, the DL/UL DCI that schedules the TDD secondary cell may not include a DL/UL DAI field. Even though the DL/UL DCI includes a DL/UL DAI field, the DL/UL DAI field may not be used for the original use. Particularly, regardless of which UL-DL configuration is included in the TDD secondary cell, the TDD secondary cell may not include a DL/UL DAI field. Even though the DL/UL DCI includes a DL/UL DAI field, the DL/UL DAI field may not be used for the original use. In addition, previously, the DL/UL DCI that schedules the TDD secondary cell included a HARQ process number bit of 4 bits, but a HARQ process number bit of 3 bits may be used in the present invention.

Let us consider a case in which the cross carrier scheduling is applied, and a TDD primary cell and an FDD secondary cell are aggregated. At the moment, it is assumed that a PUCCH is transmitted only to the primary cell.

In this case, a DL/UL DAI field is used for all UL-DL configuration of the TDD primary cell. In addition, previously, the DL/UL DCI that schedules the FDD secondary cell included a HARQ process number bit of 3 bits, but a HARQ process number bit of 4 bits may be used in the present invention.

In the UL DCI that schedules the TDD secondary cell, a UL index field is existed only in case that the UL-DL configuration of the TDD secondary cell is UL-DL configuration 0. In the UL DCI that schedules the FDD secondary cell, a UL index field may not existed. Even though the UL index field is existed, the UL index field may not be used in the original use.

Figure 17:
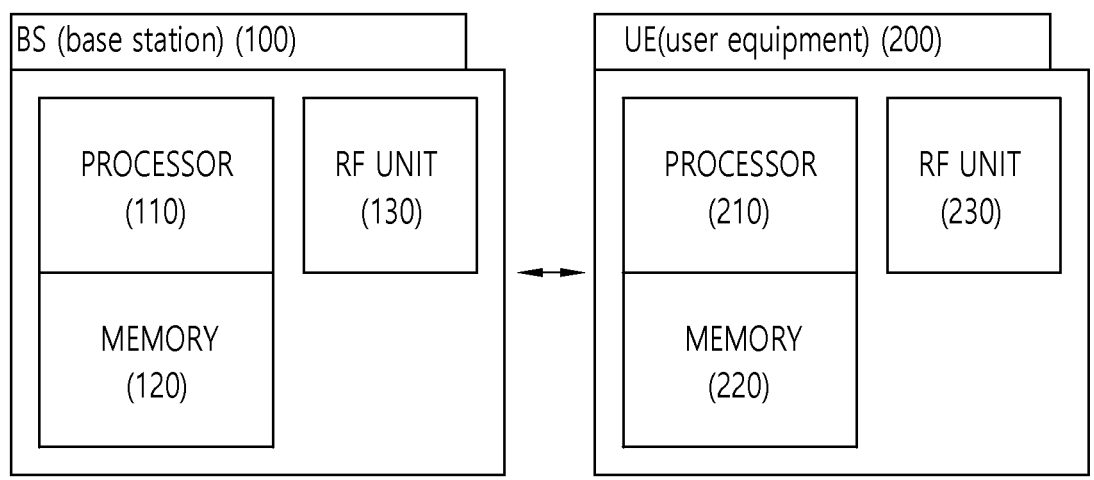
FIG. 17 is a block diagram illustrating a wireless apparatus in which the embodiments of the present specification are implemented.

FIG. 17 is a block diagram illustrating a wireless apparatus in which the embodiments of the present specification are implemented.

ABS 100 includes a processor 110, a memory 120, and an RF (radio frequency) unit 130. The processor 110 implements the proposed functions, procedure, and/or methods. For example, the processor 110 configures a plurality of serving cells that uses frame structures different with each other to a UE. For example, an FDD cell that uses an FDD frame and a TDD cell that uses a TDD frame may be configured. Then, the DCI that schedules the FDD cell and the DCI that schedules the TDD cell may be generated and transmitted. Some of the DCI may have a bit size which is different size included when scheduling the TDD cell/FDD cell solely. The memory 120 which is coupled to the processor 110 stores a variety of information for driving the processor 110. The RF unit 130 which is coupled to the processor 110 transmits and/or receives a radio signal.

A UE 200 includes a processor 210, a memory 220, and an RF (radio frequency) unit 230. The processor 210 implements the proposed functions, procedure, and/or methods. For example, the processor 210 receives a DCI that schedules a second cell through a first cell, and decodes the DCI. At the moment, a size of the DCI is determined and decoded depending on whether the second cell is the same sort of cell with the first cell. The memory 220 which is coupled to the processor 210 stores a variety of information for driving the processor 210. The RF unit 230 which is coupled to the processor 210 transmits and/or receives a radio signal.

The processor 110, 210 may include Application-Specific Integrated Circuits (ASICs), other chipsets, logic circuits, data processing devices and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the above-described scheme may be implemented as a module (process, function, etc.) for performing the above-described function. The module may be stored in the memory 120, 220 and executed by the processor 110, 210. The memory 120, 220 may be placed inside or outside the processor 110, 210 and connected to the processor 110, 210 using a variety of well-known means.

What is claimed is:

1. A method for receiving data, the method performed by a base station (BS) and comprising:
   transmitting, through a first cell, downlink control information (DCI) which schedules an uplink transmission at the first cell or a second cell; and
   receiving the data scheduled by the DCI through the first cell or the second cell,
   wherein the first cell is a cell based on a frequency division duplex (FDD) frame and the second cell is a cell based on a time division duplex (TDD) frame,
   wherein when the DCI schedules an uplink transmission at the first cell, no uplink index field is included in the DCI,
   wherein when the DCI schedules an uplink transmission at the second cell and when an uplink-downlink configuration of the second cell is uplink-downlink configuration 0 of below table, an uplink index field consisting of 2 bits is included in the DCI:

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D, | and
   wherein, in above table, D denotes a downlink subframe, S denotes a special subframe, and U denotes an uplink subframe.

2. The method of claim 1, wherein the first cell is a primary cell that performs an initial connection establishment procedure or a connection reestablishment procedure, and the second cell is a secondary cell which is additionally allocated in addition to the primary cell.

3. The method of claim 1, wherein the uplink index field is used to indicate a corresponding uplink subframe scheduled by the DCI.

4. The method of claim 1, wherein the DCI includes a specific field having a varying bit size depending on whether a cell scheduled by the DCI is a cell based on the FDD frame or a cell based on the TDD frame.

5. The method of claim 1, wherein the uplink index field consisting of 2 bits is not included in the DCI when the uplink-downlink configuration of the second cell is uplink-downlink configuration 1, 2, 3, 4, 5 or 6 of the table.

6. A base station (BS), comprising:
   a transceiver configured to transmit and receive a radio signal; and
   a processor connected to the transceiver, and configured to:
   control the transceiver to transmit, through a first cell, downlink control information (DCI) which schedules an uplink transmission at the first cell or a second cell, and control the transceiver to receive data scheduled by the DCI through the first cell or the second cell, wherein the first cell is a cell based on a frequency division duplex (FDD) frame and the second cell is a cell based on a time division duplex (TDD) frame, wherein when the DCI schedules an uplink transmission at the first cell, no uplink index field is included in the DCI, wherein when the DCI schedules an uplink transmission at the second cell and when an uplink-downlink configuration of the second cell is uplink-downlink configuration 0 of below table, an uplink index field consisting of 2 bits is included in the DCI:

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D, | wherein, in above table, D denotes a downlink subframe, S denotes a special subframe, and U denotes an uplink subframe.

7. The BS of claim 6, wherein the first cell is a primary cell that performs an initial connection establishment procedure or a connection reestablishment procedure, and the second cell is a secondary cell which is additionally allocated in addition to the primary cell.

8. The BS claim 6, wherein the uplink index field is used to indicate a corresponding uplink subframe scheduled by the DCI.

9. The BS of claim 6, wherein the DCI includes a specific field having a varying bit size depending on whether a cell scheduled by the DCI is a cell based on the FDD frame or a cell based on the TDD frame.

10. The BS of claim 6, wherein the uplink index field consisting of 2 bits is not included in the DCI when the uplink-downlink configuration of the second cell is uplink-downlink configuration 1, 2, 3, 4, 5 or 6 of the table.

* * * * *